(12) United States Patent
Ishida

(10) Patent No.: US 11,320,965 B2
(45) Date of Patent: May 3, 2022

(54) IMAGE PROCESSING APPARATUS, CONTROL METHOD, AND RECORDING MEDIUM

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/149,632

(22) Filed: Oct. 2, 2018

(65) Prior Publication Data

US 2019/0102053 A1  Apr. 4, 2019

(30) Foreign Application Priority Data

Oct. 3, 2017 (JP) .............................. JP2017-193779

(51) Int. Cl.
| | | |
|---|---|---|
| *G06F 3/0483* | (2013.01) | |
| *G06T 13/80* | (2011.01) | |
| G06F 3/04883 | (2022.01) | |
| G06F 3/01 | (2006.01) | |
| H04N 1/00 | (2006.01) | |

(52) U.S. Cl.
CPC ............ *G06F 3/0483* (2013.01); *G06T 13/80* (2013.01); *G06F 3/01* (2013.01); *G06F 3/04883* (2013.01); *H04N 1/0035* (2013.01); *H04N 1/00411* (2013.01)

(58) Field of Classification Search
CPC ............... G06F 3/04812; G06F 3/0483; G06F 15/0291; G06F 3/04883; H04M 1/27455; G06T 13/80; H04N 1/00411; H04N 1/0044
See application file for complete search history.

(56) References Cited

U.S. PATENT DOCUMENTS

| | | | | |
|---|---|---|---|---|
| 2003/0048250 A1* | 3/2003 | Boon | ...................... | G06F 3/016 |
| | | | | 345/156 |
| 2011/0029914 A1* | 2/2011 | Whitby | ................... | G06T 11/60 |
| | | | | 715/781 |

(Continued)

FOREIGN PATENT DOCUMENTS

| | | |
|---|---|---|
| CN | 101923435 A | 12/2010 |
| CN | 102792256 A | 11/2012 |

(Continued)

*Primary Examiner* — Jennifer N Welch
*Assistant Examiner* — Le V Nguyen
(74) *Attorney, Agent, or Firm* — Canon U.S.A., Inc. IP Division

(57) ABSTRACT

A control method is provided in which controlling, in a case that a moving operation of moving an operator in a direction toward a reference line is performed in a predetermined region where a first page is displayed, whether or not to perform a predetermined process based on a movement velocity of the operator in the moving operation in the predetermined region. The predetermined process is a process for displaying, on the display unit, a predetermined animation indicating a way in which the first page turns on the reference line as an axis so that an edge of the first page passes a position of the reference line and a page displayed in the predetermined region is changed from the first page to a second page.

17 Claims, 17 Drawing Sheets

(56) References Cited

U.S. PATENT DOCUMENTS

| | | | | |
|---|---|---|---|---|
| 2012/0180002 A1* | 7/2012 | Campbell | ............ | G06F 3/04883 |
| | | | | 715/863 |
| 2012/0254713 A1* | 10/2012 | Roth | ..................... | G06F 17/218 |
| | | | | 715/209 |
| 2012/0311438 A1* | 12/2012 | Cranfill | ................ | G06Q 20/123 |
| | | | | 715/256 |
| 2013/0057489 A1* | 3/2013 | Morton | ................... | G06F 1/169 |
| | | | | 345/173 |
| 2013/0198678 A1* | 8/2013 | Lee | ....................... | G06F 3/0483 |
| | | | | 715/776 |
| 2013/0232439 A1* | 9/2013 | Lee | ....................... | G06F 3/0488 |
| | | | | 715/776 |
| 2016/0210004 A1* | 7/2016 | Shinohara | ............. | G06F 3/0485 |
| 2017/0045996 A1* | 2/2017 | Ka | .......................... | G06F 3/165 |

FOREIGN PATENT DOCUMENTS

| | | | |
|---|---|---|---|
| CN | 102804182 | A | 11/2012 |
| CN | 104272246 | A | 1/2015 |
| CN | 104679433 | A | 6/2015 |
| JP | H07319899 | A | 12/1995 |
| JP | 2015179536 | A | 10/2015 |
| JP | 201737429 | A | 2/2017 |

\* cited by examiner

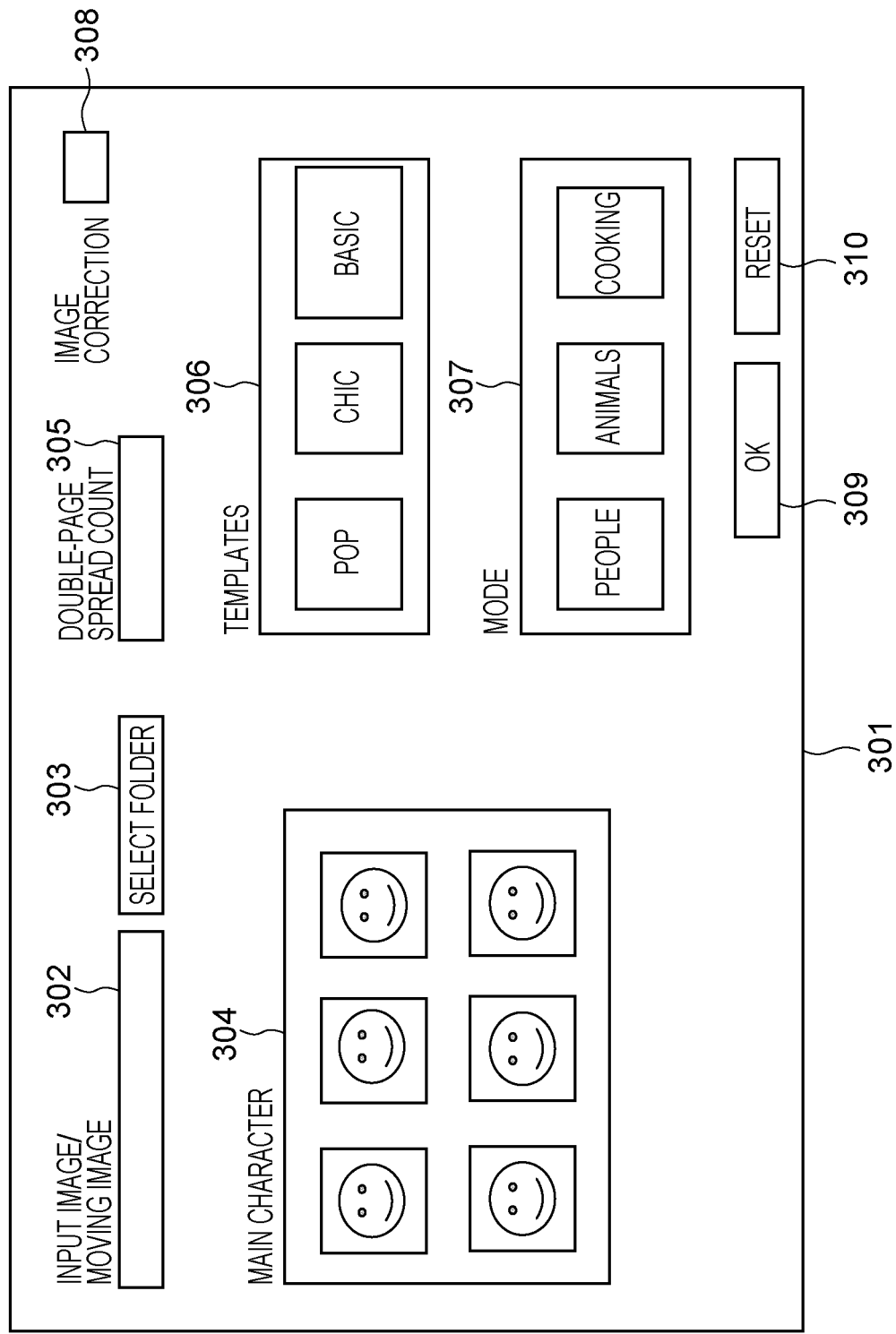

FIG. 5

| Image ID | Date and Time of Shooting | Image Attributes | Focus | Object Classification | | | | | | Face Count | Individual ID | | | | | |
|---|---|---|---|---|---|---|---|---|---|---|---|---|---|---|---|---|
| | | | | TOP1 | | TOP2 | | TOP3 | | | 1 | | 2 | | 3 | |
| | | | | Category | Reliability | Category | Reliability | Category | Reliability | | Upper Left Position | Lower Right Position | Upper Left Position | Lower Right Position | Upper Left Position | Lower Right Position |
| 1 | 7/1/2015 10h11m12s | STILL IMAGE | O | PEOPLE | 90 | – | – | – | – | 6 | 40,40 | 65,65 | 90,40 | 115,65 | 10,20 | 25,35 |
| 2 | 7/1/2015 10h12m30s | MOVING IMAGE | O | PEOPLE | 80 | ANIMALS | 40 | – | – | 2 | 50,100 | 100,150 | 150,125 | 190,165 | 150,125 | 190,165 |
| 3 | 7/1/2015 10h15m54s | SNS | O | ANIMALS | 70 | PEOPLE | 10 | COOKING | 5 | 0 | – | – | – | – | – | – |
| ⋮ | | | | ⋮ | | ⋮ | | ⋮ | | ⋮ | ⋮ | | ⋮ | | ⋮ | |

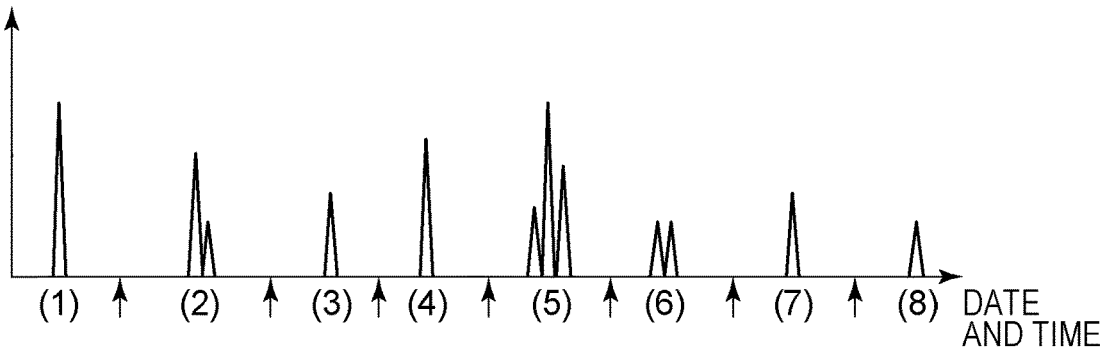
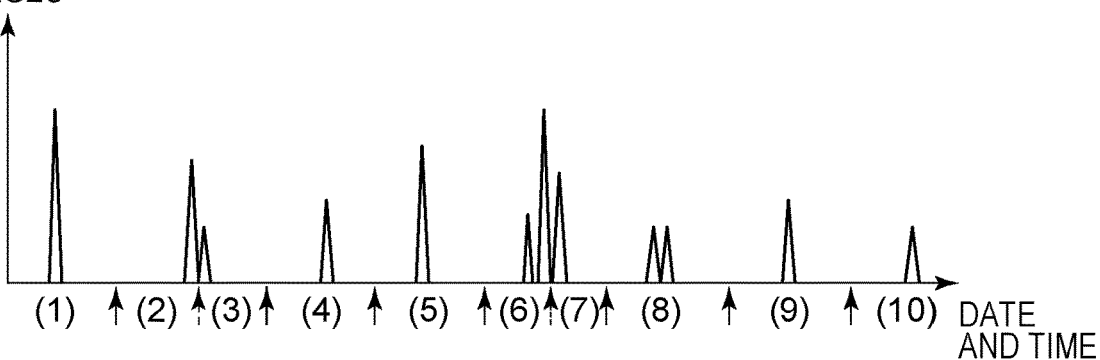
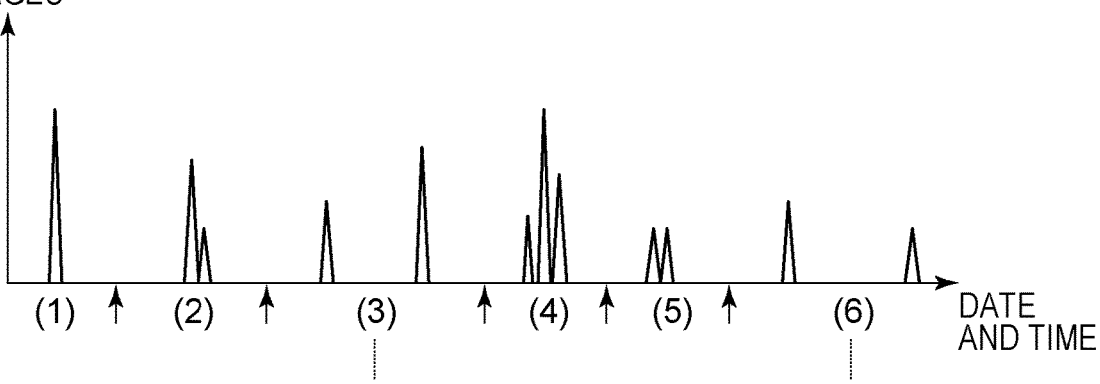

FIG. 7

| SCENE | SHOOTING PERIOD (TIME) | | IMAGES SHOT (COUNT) | | PEOPLE TAKEN (COUNT) | |
|---|---|---|---|---|---|---|
| | AVERAGE | STANDARD DEVIATION | AVERAGE | STANDARD DEVIATION | AVERAGE | STANDARD DEVIATION |
| TRAVELS | 33.221 | 4.778 | 324.857 | 393.691 | 1.506 | 0.256 |
| EVERYDAY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURES OF MAIN SLOT | IMAGE FEATURES OF SUB-SLOT |
|---|---|---|
| TRAVELS | GENERAL IMAGES INCLUDING PEOPLE AND SCENERY | CLOSE-UPS AND PROFILE IMAGES |
| EVERYDAY LIFE | CLOSE-UPS AND PROFILE IMAGES | GENERAL IMAGES INCLUDING PEOPLE AND SCENERY |
| CEREMONY | IMAGES WHERE TWO ARE CLOSE TO EACH OTHER | IMAGES OF GREAT NUMBERS OF PEOPLE |

FIG. 8B

| IMAGE ID | SCORE (OUT OF A PERFECT SCORE OF 50) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

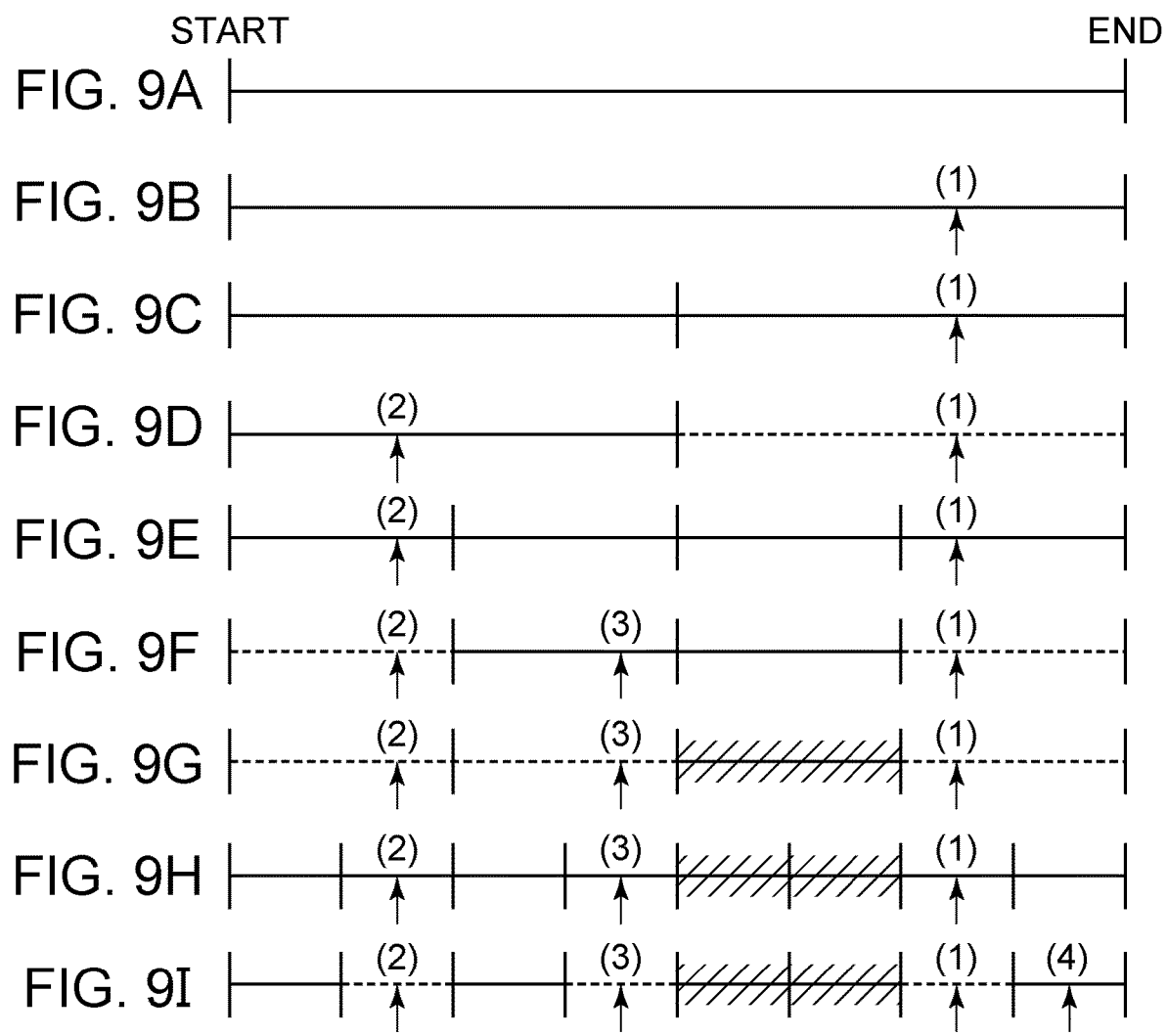

IMAGE PROCESSING APPARATUS, CONTROL METHOD, AND RECORDING MEDIUM

BACKGROUND

Field of the Disclosure

The present disclosure relates to an image processing apparatus, a control method, and a recording medium.

Description of the Related Art

There conventionally is known a technology for displaying images representing books such as photo albums or the like, on a display unit that an image processing apparatus such as a personal computer, smartphone, or the like have. Japanese Patent Laid-Open No. 2017-37429 discloses a technology of displaying preview screens of photo albums represented by photo album data on a display unit. Technology for displaying the way in which pages of an album displayed on a display unit are turned by animation, is also disclosed.

As technology for displaying books on display units becomes more commonplace, there is demand for expressing movement of displayed pages in a more realistic manner, to satisfy users with the way in which pages are turned.

It has been found desirable to express movement of displayed pages more realistically.

SUMMARY

A control method of an image processing apparatus includes: displaying of a page on a display unit; and controlling, in a case that a moving operation of moving an operator in a direction toward a reference line is performed in a predetermined region where a first page is displayed, whether or not to perform a predetermined process based on a movement velocity of the operator in the moving operation in the predetermined region. The predetermined process is a process for displaying, on the display unit, a predetermined animation indicating a way in which the first page turns on the reference line as an axis so that an edge of the first page passes a position of the reference line and a page displayed in the predetermined region is changed from the first page to a second page.

Further features of the present disclosure will become apparent from the following description of exemplary embodiments with reference to the attached drawings.

BRIEF DESCRIPTION OF THE DRAWINGS

FIG. 3 is a diagram illustrating a settings screen displayed by the album creation application.

FIG. 5 is a diagram illustrating a table for managing image analysis information of image data.

FIGS. 6A through 6C are diagrams for describing segmentation of image data groups.

FIG. 7 is a diagram for describing scene classification.

FIGS. 8A and 8B are diagrams for describing scoring with regard to main slots and sub slots.

FIGS. 9A through 9I are diagrams for describing selection of image data.

DESCRIPTION OF THE EMBODIMENTS

An embodiment of the present disclosure will be described in detail below with reference to the attached drawings. It should be noted that the following embodiment does not restrict the present disclosure as set forth in the Claims, neither are all combinations of features described in the present embodiment indispensable to carry out the present disclosure.

Procedures for running an application program for creating an album (hereinafter also referred to as "album creation application") on an image processing apparatus, up to generating an automatic layout, will be described in the present embodiment. In the following descriptions, unless specifically stated otherwise, the term "image" includes still images, moving images, and frame images in moving images, and still images and moving images and frame images in moving images on a social networking service (SNS) server.

Figure 15:
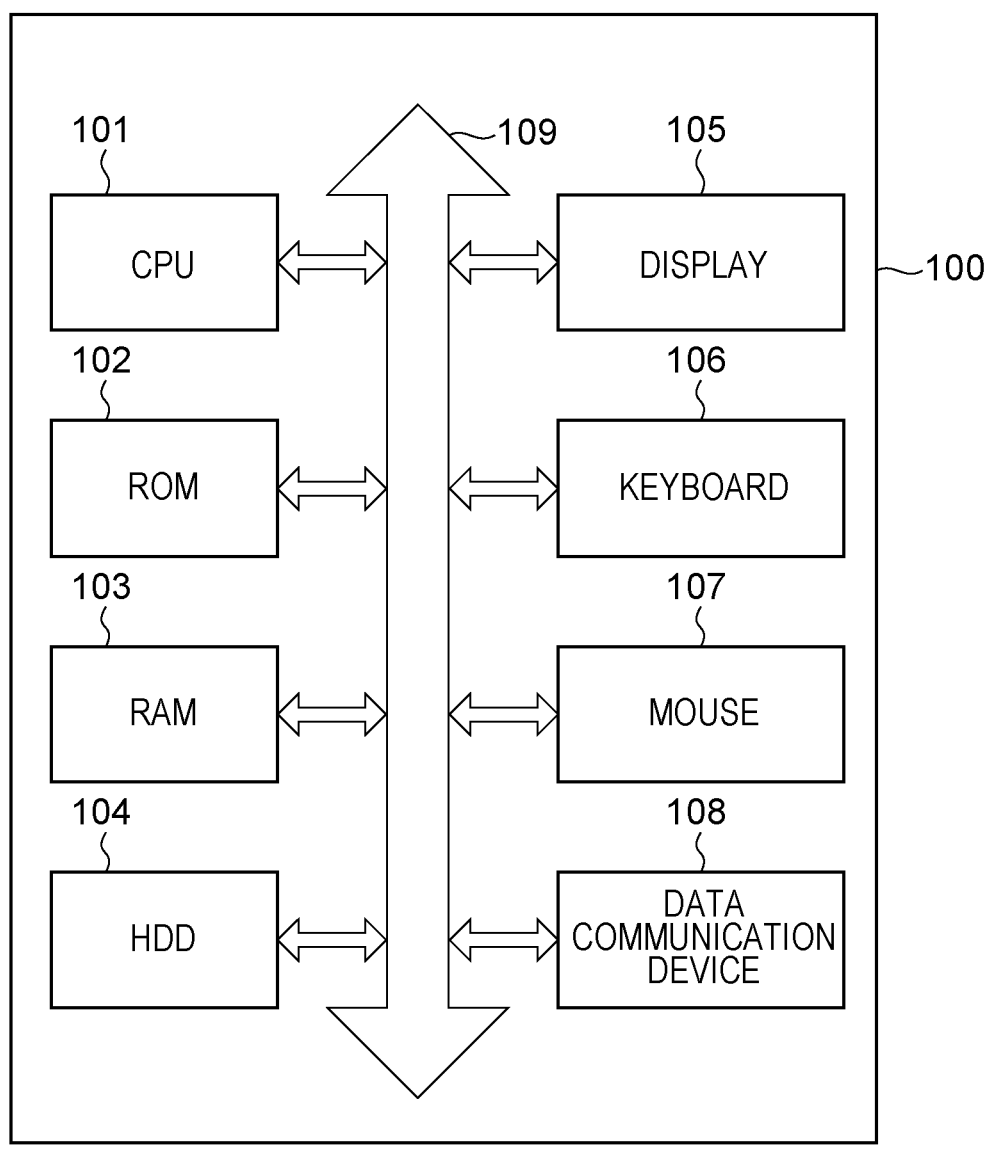
FIG. 15 is a block diagram for describing the configuration of hardware of the image processing apparatus.

FIG. 15 is a block diagram for describing the hardware configuration of an image processing apparatus 100 according to the present disclosure. Examples of image processing apparatuses include personal computers (PC), smartphones, tablet terminals, cameras, printers, and so forth, and is a PC in the case of the present embodiment. The image processing apparatus 100 in FIG. 15 includes a central processing unit (CPU) 101, read only memory (ROM) 102, random access memory RAM 103, a hard disk drive (HDD) 104, a display device 105, a keyboard 106, a mouse 107, and a data communication unit 108. These are connected to each other via a data bus 109.

The CPU (processor) 101 is a system control unit that controls the overall image processing apparatus 100. The CPU 101 executes the image processing method described in the present embodiment following programs. Although the number of CPUs is illustrated as being one, this is not restrictive, and multiple CPUs may be included.

The ROM 102 stores programs and an operating system (OS) executed by the CPU 101. The RAM 103 provides memory for temporarily storing various types of information when the CPU 101 executes programs. The HDD 104 is a storage medium for storing image files, databases for storing processing results such as image analysis and so forth, and the like. The RAM 103 stores a later-described album creation application in the present embodiment.

The display device 105 is a device that presents the user with a user interface (UI) according to the present embodiment and image layout results. The display device 105 may have touch sensor functions. The keyboard 106 is an input device that is used to input predetermined information at the UI displayed on the display device 105. Examples of predetermined information include information of a count of double page spreads, page count, and so forth, in an album to be created. The mouse 107 is an input device that is used to click on buttons in the UI displayed on the display device 105, for example. Note that the album creation program is activated by the user double-clicking on an icon corresponding to the album creation program displayed on the display device 105, by operating the mouse 107, for example.

The data communication unit 108 is a device for communicating with external devices such as printers, servers, and so forth. For example, data created by the album creation program is transmitted to an unshown printer or server connected to the image processing apparatus 100 via the data communication unit 108. The data communication unit 108 also receives still image data on an unshown server or SNS server. Although the data communication unit 108 according to the present embodiment receives still image data from the SNS server, moving image data may be received as well. The data bus 109 connects the above-described members (102 through 108) and the CPU 101.

Figure 11:
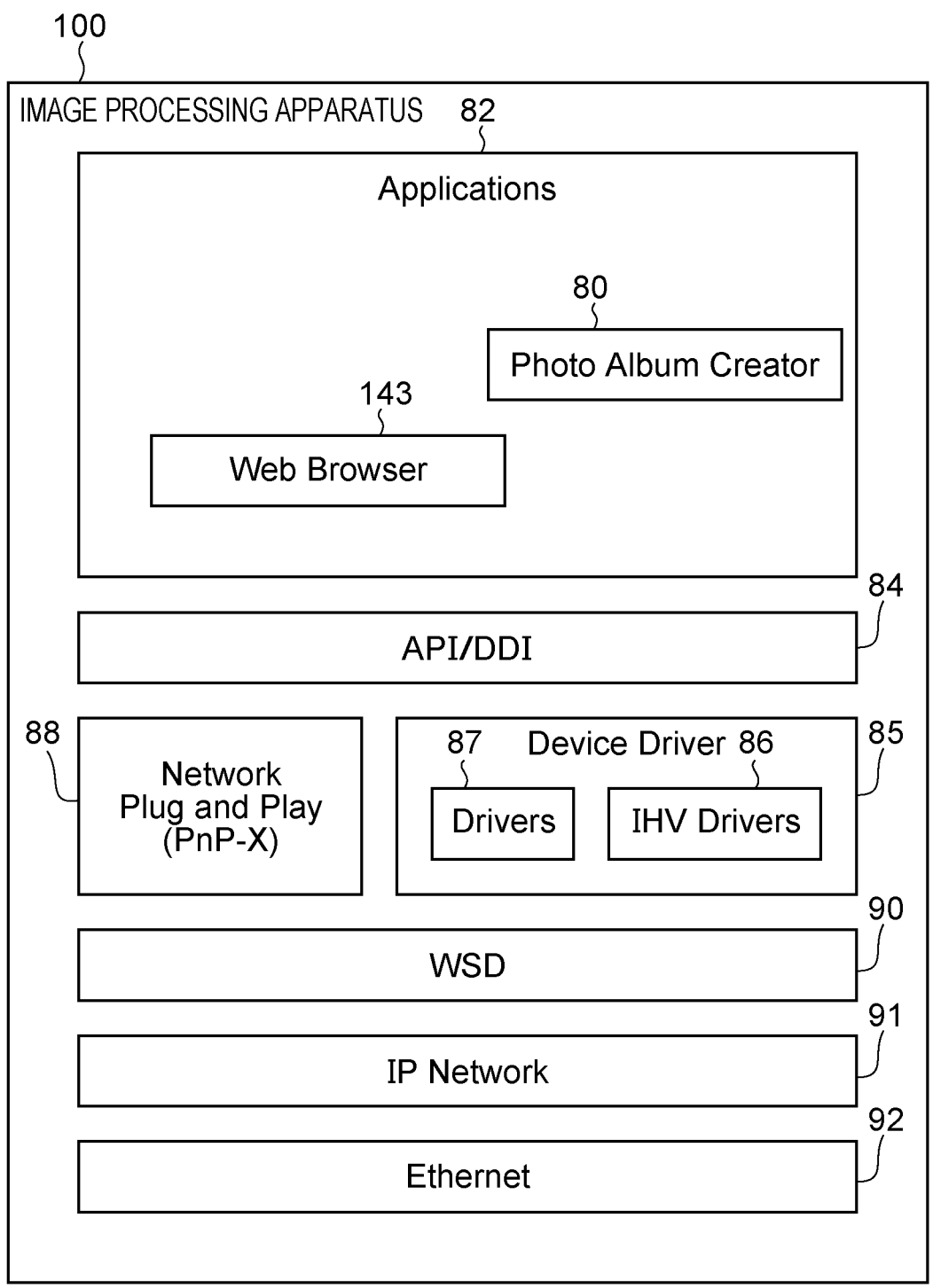
FIG. 11 is a diagram illustrating an example of a module configuration that the image forming apparatus has.

FIG. 11 is a diagram representing an example of a module configuration that the image processing apparatus 100 has. In FIG. 11, a module 92 is an Ethernet control stack that controls Ethernet. A module 91 is an Internet protocol network control stack that controls an IP network. A module 90 is a Web Service on Devices (WSD) control stack that controls WSD that provides an arrangement for searching for devices on a network. A module 88 is a PnP-X (short for Plug and Play Extensions, which is a standard inclusion in the Windows 8 (registered trademark) OS as a series of extension functions related to plug-and-play) control stack that controls plug-and-play for a network. A module 85 is a device driver group, made up of a standard driver group 87 bundled with the OS as a standard, and an independent hardware vendor (IHV) product driver group 86 provided by an IHV.

A module 84 is an application/device driver interface (DDI) interface, configured including an application programming interface (API) and DDI. A module 80 is a photo album creation application for example, and module 143 is a Web browser application for example. A module 82 is an application group, including modules 80, 143, and so forth.

Figure 1:
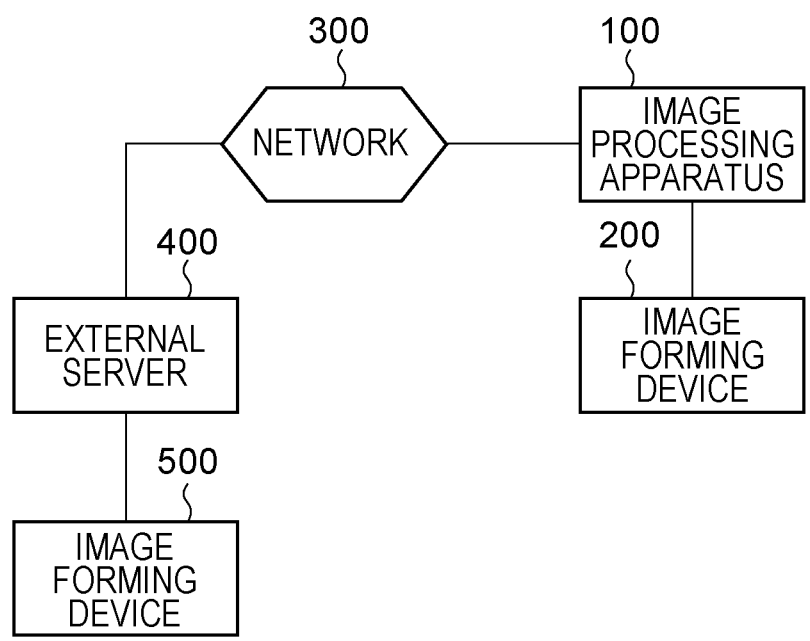
FIG. 1 is a diagram illustrating the configuration of a print system.

FIG. 1 is a diagram illustrating a print system according to the present embodiment. This print system includes, besides the image processing apparatus 100, an image forming apparatus 200, a network 300, an external server 400, and an image forming apparatus 500.

The image forming apparatus 200 executes image forming processing (print processing) for forming images on a recording medium using a recording material, based on a print job accepted from the image processing apparatus 100 or the like. Although an arrangement will be described in the present embodiment where the image processing apparatus 100 transmits (outputs) generated layout information to an external server, an arrangement may be made where the image processing apparatus 100 transmits generated layout information to the image forming apparatus 200 as a print job, for example. In this case, the album based on layout information is created by the image forming apparatus 200.

The network 300 is a communication network that connects the image processing apparatus 100 and the external server 400, for transmitting information between the two. The network 300 may be a wired network, or may be a wireless network.

The external server 400 accepts later-described layout information from the image processing apparatus 100 via the network 300. That is to say, the external server 400 is a server governing order reception and management of albums. When album purchasing procedures are performed by a user operating the image processing apparatus 100, the external server 400 causes the image forming apparatus 500 to create an album based on the accepted layout information by image forming processing. Thereafter, the album created by the image forming apparatus 500 is delivered to the user who has performed the album purchasing procedures.

Automatic Layout of Album

Figure 2:
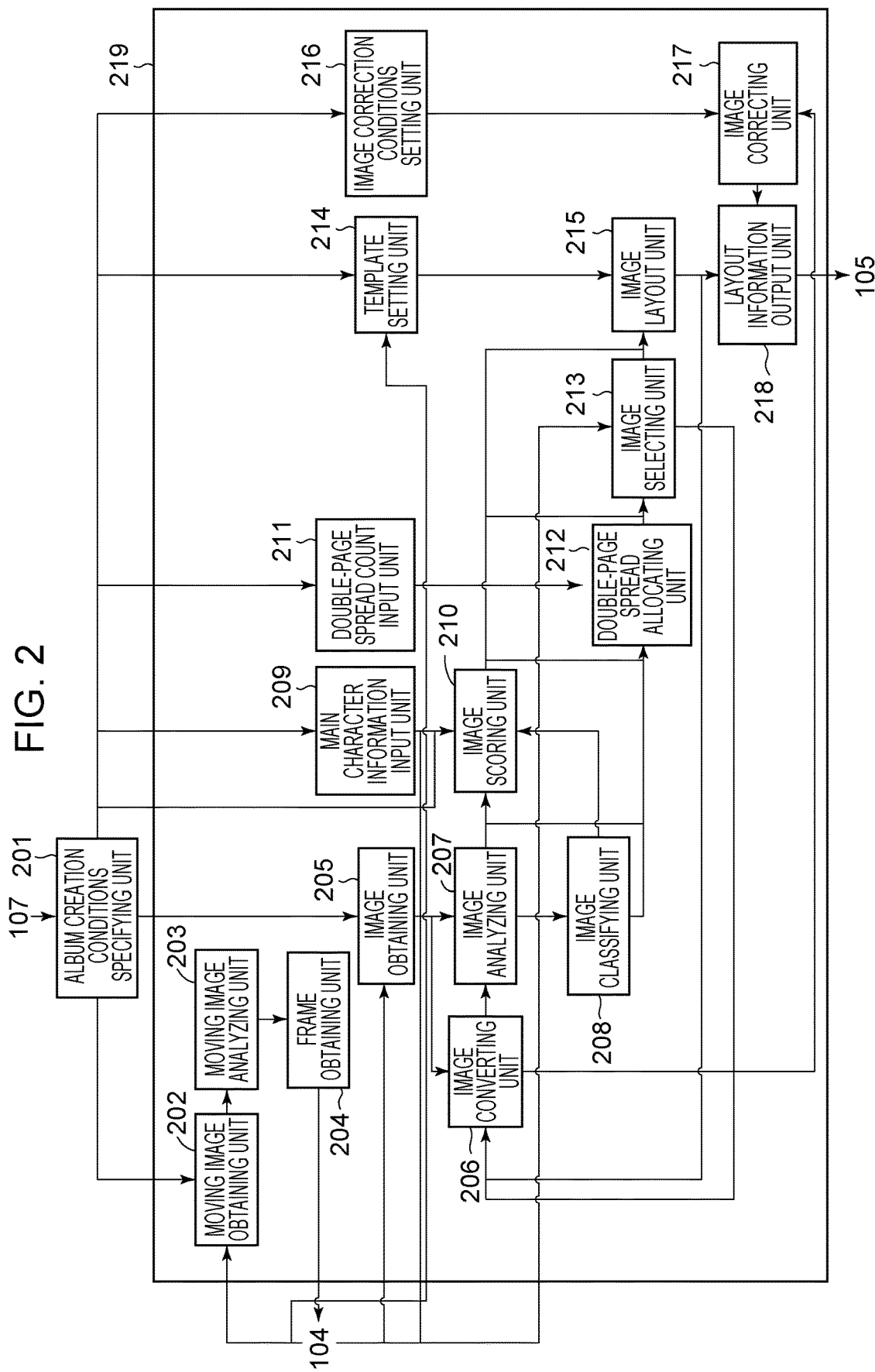
FIG. 2 is a block diagram illustrating configuration of an album creation application.

FIG. 2 is a block diagram of an application program for creating albums (hereinafter, "album creation application") according to the present embodiment. In the present embodiment, the album creation application saved in the HDD 104 is activated by the user operating the mouse 107 to double-click on an icon corresponding to the album creation application that is displayed on the display device 105. The album creation application is saved in the HDD 104 by being installed from an external server via the data communication unit 108.

The album creation application has various functions, of which an automatic layout function provided by an automatic layout processing unit 219 will be described herein particular. The automatic layout function is a function of generating layout images, which are images where images represented by image data obtained by classifying selecting still images and moving images based on content and attributes, and laid out in templates prepared beforehand. Further, the automatic layout function is a function for generating layout information representing such layout images. Layout images displayed in this way are output as an album by the user performing album ordering processing.

The album creation application includes an album creation conditions specifying unit 201 and the automatic layout processing unit 219, as illustrated in FIG. 2. The album creation conditions specifying unit 201 accepts specification of album creation conditions in accordance with operation of a later-described UI by the mouse 107 for example, and outputs to the automatic layout processing unit 219. Examples of conditions that are specified include IDs of image data and main character that are the object of processing, count of double-page views in the album, template information on/off conditions regarding color correction, on/off conditions regarding use of moving images, album mode, and so forth. Note that a double-page spread is equivalent to a pair of pages adjacent to each other, printed of different sheets (or pages). The album creation application according to the present embodiment creates a double-page spread layout in a single display window. The album creation conditions specifying unit 201 displays a settings screen such as illustrated in FIG. 3, for example, and accepts input to this screen, thereby accepting specification of album creation conditions. A moving image obtaining unit 202 obtains a moving image group (moving image data group), specified by the album creation conditions specifying unit 201, from a storage region such as the HDD 104 or the like.

A moving image analyzing unit 203 analyzes image data obtained by the moving image obtaining unit 202. Note that the moving image analyzing unit 203 extracts frames cut out of moving image data and managed in time-sequence order, at predetermined intervals, and takes these as the object of analysis. The moving image analyzing unit 203 can identify which frame in a moving image is a good image, by performing analysis processing of object detection, size identification, smile determination, closed-eye determination, determination of blurring due to shaking, brightness determination, and so forth. Based on the results (evaluation) from the analysis at the moving image analyzing unit 203, a frame obtaining unit 204 cuts frames out from the moving image, and saves the cut-out frames in the HDD 104 as image data.

An image obtaining unit 205 obtains an image group (image data group) specified by the album creation conditions specifying unit 201 from a storage region such as the HDD 104 or the like. Note that the image obtaining unit 205 may obtain an image group from a storage region such as a server on a network, and SNS server, or the like, via the data communication unit 108. An image group as used here means candidates for image data to be used to create an album. For example, there are cases where a time period of January 1 through December 31 of a certain year is specified as conditions relating to the time and data at which the image data that is the object of being laid out was generated, i.e., photographs corresponding to the image data were taken (hereinafter referred to as time and date of shooting). In this case, the image obtaining unit 205 obtains all image data generated from January 1 through December 31 of that particular year as an image group.

Image data saved in the storage region is, for example, still image data, and cut-out image data obtained by frames being cut out from moving image data. Still image data and cut-out image data have been obtained from an imaging device. The image processing apparatus 100 may have the imaging device, or an external device (PC, smartphone, digital camera, tablet terminal, etc.) that is a device outside of the image processing apparatus 100 may have the imaging device. In a case of obtaining image data from an external device, the image processing apparatus 100 obtains image data via the data communication unit 108. The image processing apparatus 100 may also obtain still image data and cut-out image data from a network or server via the data communication unit 108. The CPU 101 analyzes data accompanying the image data, and determines where each image data has been obtained from.

An image converting unit 206 converts pixel count information and color information of the image data obtained by the image obtaining unit 205. Into what sort of pixel count information and color information image data the conversion is to be performed by the image converting unit 206 is decided beforehand, and this information is saved by the album creation application or in a parameter file that the album creation application uses. In the present embodiment, the image data obtained by the image obtaining unit 205 is converted into image data of 420 pixels on the short side, and color information according to sRGB.

An image analyzing unit 207 performs analyzing processing on the image data. In the present embodiment, the image analyzing unit 207 processes analyzing of image data that has been converted at the image converting unit 206. Specifically, feature amounts are obtained from the converted image data, and object detection, face detection, emotion recognition of detected faces, and personal recognition of detected faces, is performed for the converted image data. Further, an arrangement may be made where shooting date-and-time information is obtained from data (e.g., exchangeable image file format (Exif) information) accompanying pre-conversion image data obtained by the image obtaining unit 205. The shooting date-and-time information is not restricted to being obtained from Exif information, and information of the date and time of creating or updating image data may be used. The date and time of uploading image data to a local server or SNS server, or the date and time of downloading image data from a local server or SNS server, may be used. Such date and time information also is handled as shooting date-and-time information below. Note that a local server is a storage region that the image processing apparatus 100 has, such as the HDD 104 or the like.

An image classifying unit 208 executes later-described scene segmentation and scene classification of the image data group, using object detection result information such as shooting date-and-time information, count, information of faces detected, and so forth. Scenes are shooting scenes such as "travels", "everyday life", "weddings", and so forth. Scenes can be said to be an assembly of image data generated at a shooting opportunity during one period.

A main character information input unit 209 inputs an ID (identification information) of a main character specified from the album creation conditions specifying unit 201, to an image scoring unit 210. The image scoring unit 210 scores each image data so that image data appropriate for layout has high scores. The scoring is performed in accordance with the information obtained by the image analyzing unit 207 and information obtained by the image classifying unit 208. Other information may be additionally or substitutionally used. In the present embodiment, the image scoring unit 210 scores each image data so that the score of image data having the main character ID input from the main character information input unit 209 is high.

A double-page spread count input unit 211 inputs a double-page spread count of the album input from the album creation conditions specifying unit 201, to a double-page spread allocating unit 212. The double-page spread allocating unit 212 performs grouping of the image group, and allocates to the double-page spreads. The double-page spread allocating unit 212 groups image groups in accordance with the number of double-page spreads input, and allocates part of the image group to each double-page spread. An image selecting unit 213 selects image data representing layout images to be laid out in a template from the image group allocated to each double-page spread by the double-page spread allocating unit 212, based on scores given by the image scoring unit 210.

A template setting unit 214 reads in multiple templates from the HDD 104 in accordance with template information specified from the album creation conditions specifying unit 201, and inputs to an image layout unit 215. Note that the multiple templates in the present embodiment are saved by the album creation application saved in the HDD 104. The multiple templates include information relating to the overall size of the template, for example, and information relating to the number, sizes, and positions of slots of the templates, and so forth.

Figure 12:
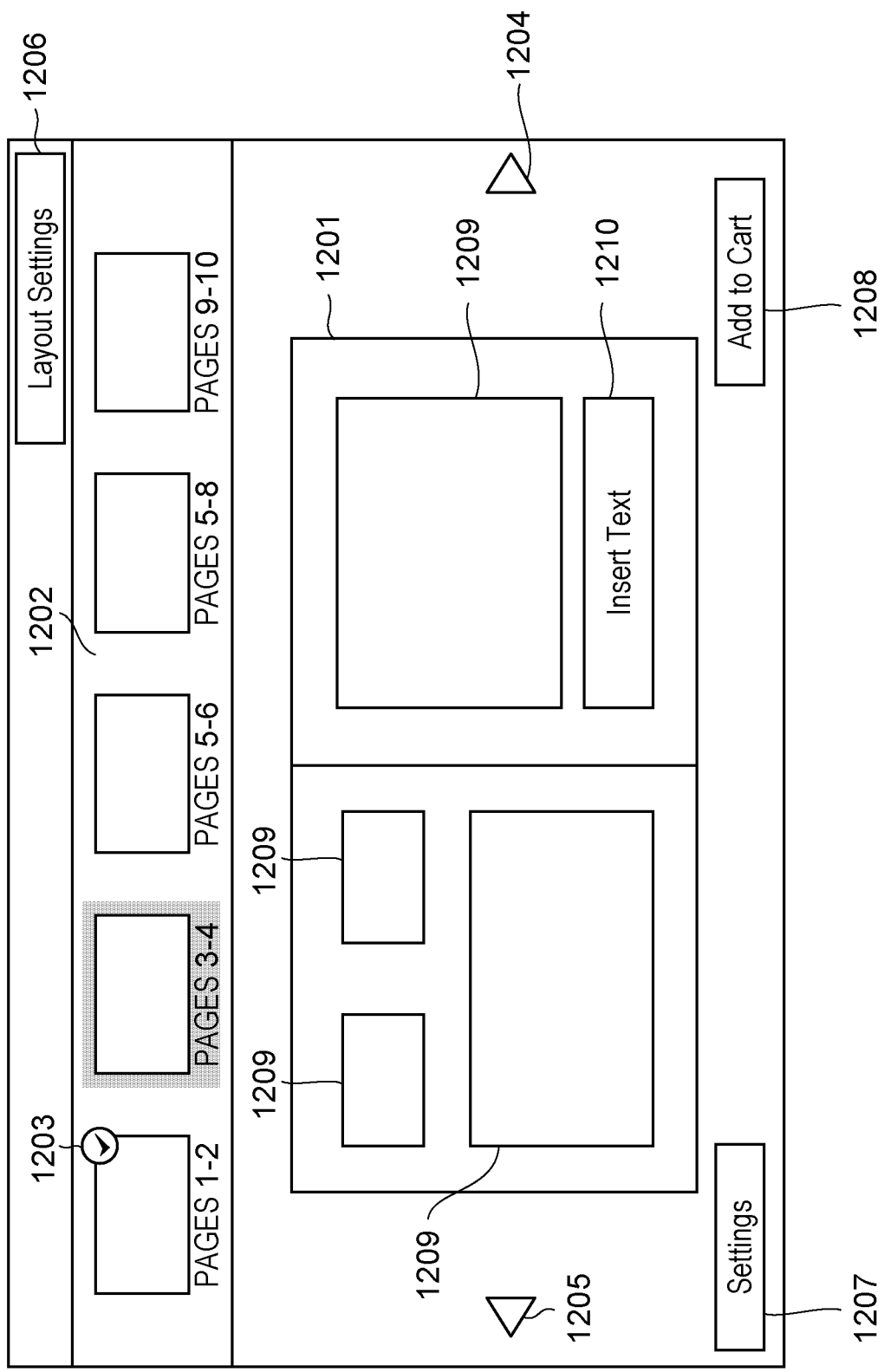
FIG. 12 is a diagram illustrating an editing screen for editing layout information.

The image layout unit 215 decides the layouts of the double-page spreads. Specifically, the image layout unit 215 selects, from the multiple templates input from the template setting unit 214, templates appropriate for the image data selected by the image selecting unit 213, and decides the layout positions of the images. Accordingly, the layouts of the double-page spreads are decided. The image data output from a layout information output unit 218 is displayed on the display device 105 in a format such as shown in FIG. 12, for example.

The layout information output unit 218 outputs layout information to the display device 105 for display of layout images, following the layouts decided by the image layout unit 215. Layout images are, for example, images where layout images representing image data selected by the image selecting unit 213 are laid out in the selected templates, and layout information is bitmap data representing these images.

An image correcting unit 217 performs various types of correction processing, such as dodging correction (luminance correction), red-eye correction, contrast correction, and so forth. An image correction conditions setting unit 216 inputs image correction on/off conditions specified from the album creation conditions specifying unit 201 to the image correcting unit 217.

Upon the album creation application according to the present embodiment being installed in the image processing apparatus 100, an activation icon is generated on a top screen (desktop) displayed on the display device 105 by the OS running on the image processing apparatus 100. When the user double-clicks on the activation icon by operating the mouse 107, the program of the album creation application saved in the HDD 104 is loaded to the RAM 103. The program loaded to the RAM 103 is executed by the CPU 101, and thus the album creation application is activated.

FIG. 3 is a diagram illustrating an example of a UI configuration screen 301 that the activated album creation application provides. The UI configuration screen 301 is displayed on the display device 105. The album creation conditions specifying unit 201 obtains the contents of settings specified by the user by the user setting later-described album creation conditions via the UI configuration screen 301. A path box 302 in the UI configuration screen 301 indicates a location (path) to where groups of images and moving images, from which an album is created, is saved in the HDD 104. A folder selection button 303 is clicked to selectably display a folder including groups of images and moving images from which an album is created in a tree configuration, by the user performing a clicking operation by the mouse 107. The path to a folder including the groups of images and moving images selected by the user is displayed in the path box 302.

A main character specifying icon 304 is an icon for the user to specify a main character, with facial images of people being displayed as icons. The person corresponding to the icon selected by the user is set as the main character of the album that is to be created. The main character specifying icon 304 is used to identify the main character that is the center person, from people in images represented by images to be analyzed. The main character specifying icon 304 is, for example, a facial image of a person decided out of facial images of people registered in a face databased for example, by being selected by the user, or by being decided by a later-described method. Note that the main character can be automatically set by the procedures illustrated in FIGS. 4A and 4B as well.

A double-page spread box 305 accepts settings of a double-page spread count for the album from the user. The user directly inputs numerals to the double-page spread box 305 via the keyboard 106, or inputs numerals to the double-page spread box 305 from a list using the mouse 107.

A template specification icon 306 displays illustration icons indicating the theme of the template (pop, chic, etc.) for the user to select from according to his/her taste. The template corresponding to the icon selected by the user operations is set as the template to be used for creating the album. The template in the present embodiment has image layout frames (slots) to lay out image data in. By image data being embedded in the slots that the template has, one layout image is completed.

A mode specifying portion 307 is an icon corresponding to the mode of the album to be created. An album mode is used to lay out images containing a predetermined object in the template with priority, so albums of each mode will have a greater number of objects corresponding to the respective modes laid out. Three modes are provided in the present embodiment, which are "people", "animals", and "cooking". The album mode can be said to be the subject of the album. In a case where "animals" is selected as the album mode, images containing animals are laid out in the template with priority. There may be modes provided besides the above-described three modes, to lay out image data representing images containing objects besides these in templates with priority. Multiple modes may be selected at the same time. In this case, at least one image containing multiple objects corresponding to the multiple modes selected is laid out in the template with priority. The modes corresponding to the selected icons are set as the modes of the album to be created. Examples of album modes besides the above three include "buildings", "vehicles", "flowers", and so forth.

A checkbox 308 accepts on/off settings for image correction form the user. An OK button is a button for accepting indication of completion of settings from the user. When the user presses the OK button 309, the album creation conditions specifying unit 201 outputs information of the settings set in the UI configuration screen 301 to the automatic layout processing unit 219, to be applied to the modules corresponding to the settings information. A reset button 310 is a button for resetting the settings information in the UI configuration screen 301. Note that settings other than those described above may be made at the UI configuration screen 301. Examples include settings relating to moving images, settings regarding acquisition sources of data for images and moving images, and so forth.

A server name box indicates the name of the server or the name of the SNS including an image group used for album creation. Once login to the specified server or SNS is completed by user operations via a login screen, the CPU 101 can obtain image data from the specified server or SNS. A moving image usage checkbox accepts settings from the user regarding whether or not to use moving images in the folder specified by the path box 302 or moving images at the specified server or SNS to create the album. An object period box accepts user settings regarding conditions of shooting date-and-time for the image group or moving image group that is the object of album creation. Note that the screen illustrated in FIG. 3 may include a region representing a rendering of the completed album or the like, represented by the layout information generated by the settings currently input.

Figure 4A:
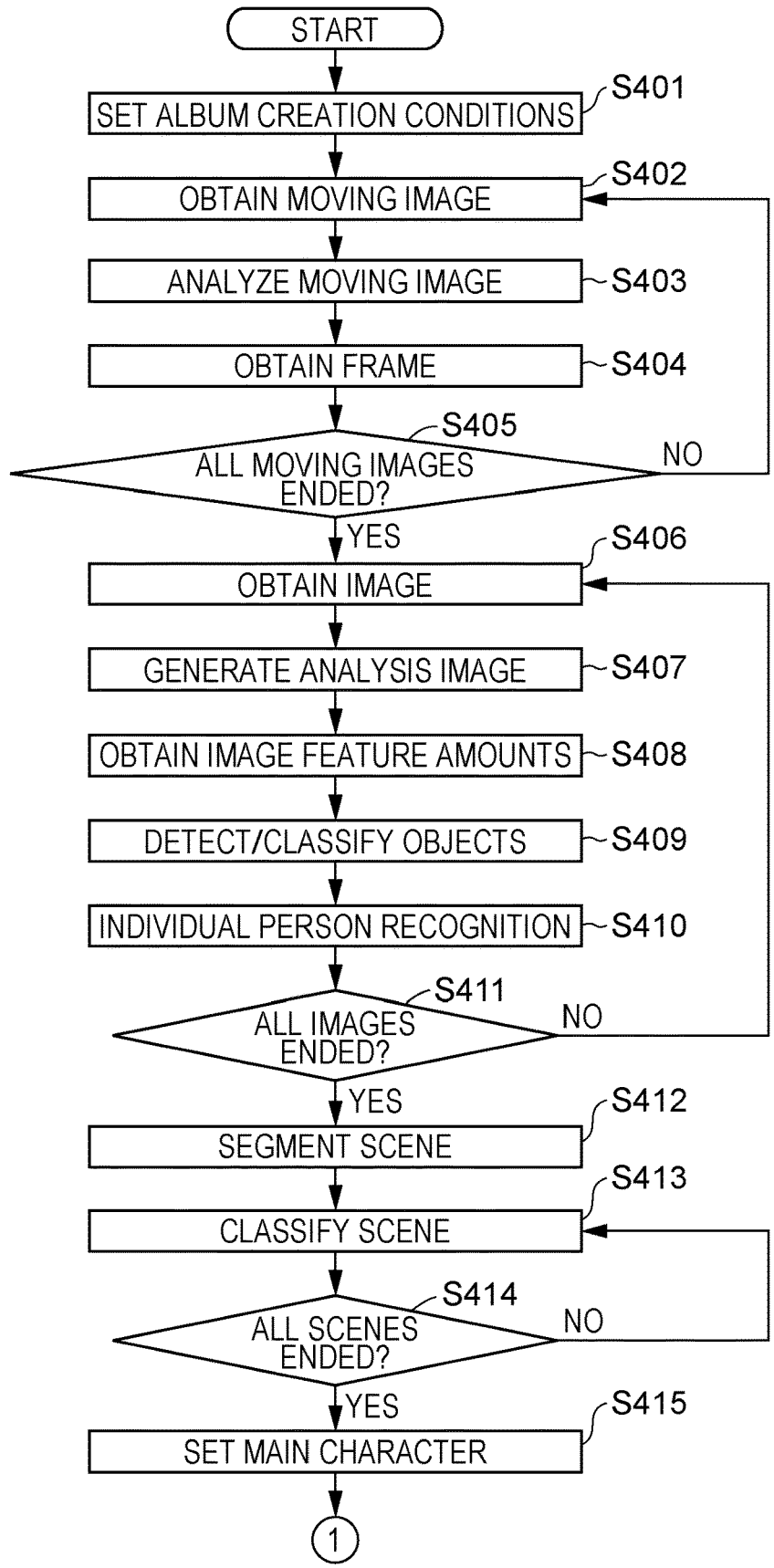
FIGS. 4A and 4B is a flowchart illustrating automatic layout processing executed by the album creation application.
Figure 4B:
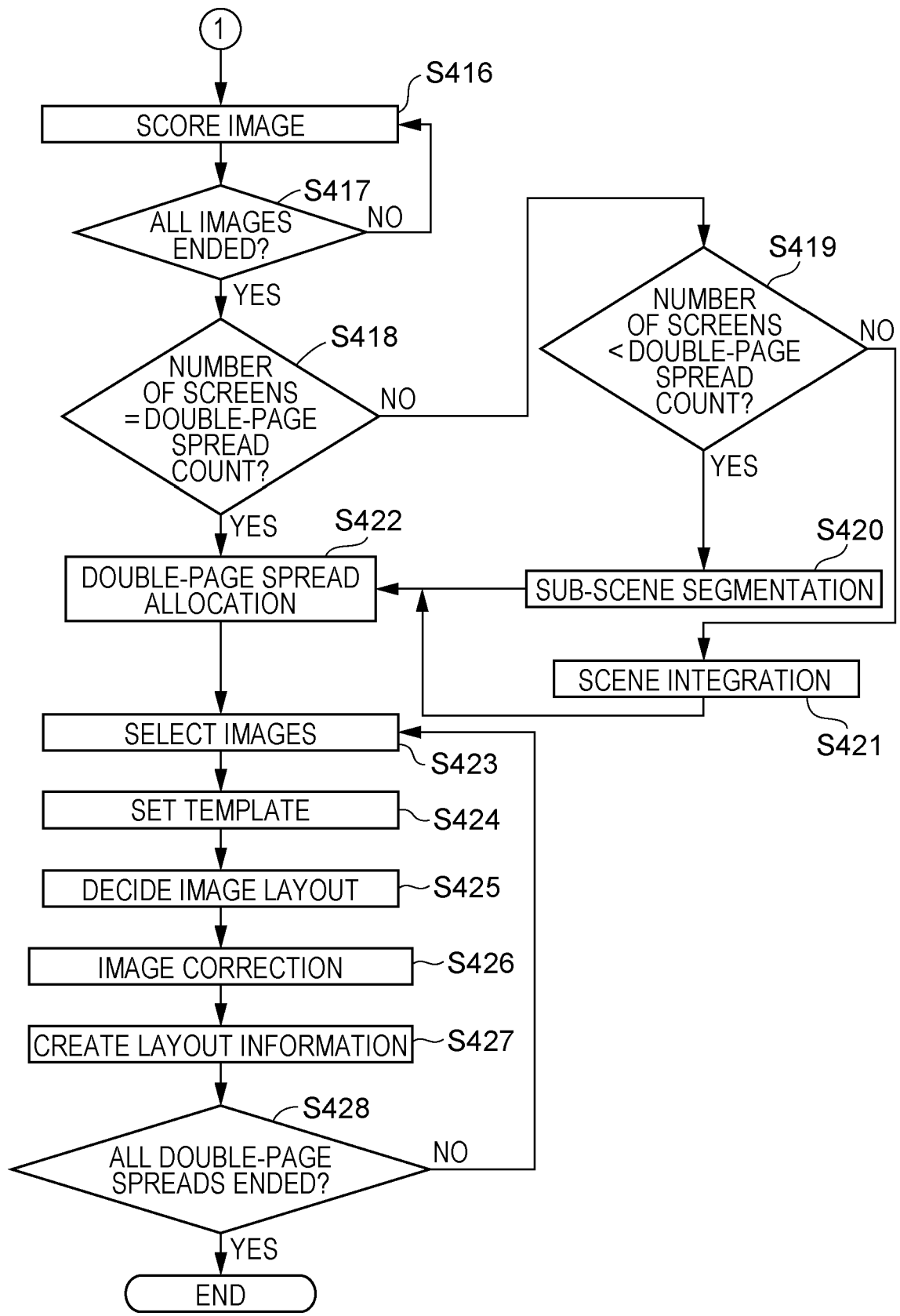

FIGS. 4A and 4B is a flowchart illustrating automatic layout processing executed by the album creation application according to the present embodiment. The flowchart illustrated in FIGS. 4A and 4B is realized, for example, by a program corresponding to the album creation application stored in the HDD 104 being read out to the ROM 102 and RAM 103 and executed by the CPU 101. Automatic layout processing will be described with reference to FIGS. 4A and 4B. In the present embodiment, an image group for creating an album is segmented in accordance with shooting time when creating an album, and images to be selected for layout in pages are selected by sub-image groups obtained by segmenting, which will be described later. The flowchart illustrated in FIGS. 4A and 4B is started when the button 309 is selected, for example.

First, The CPU 101 sets album creation conditions in S401. Specifically, album creation conditions are accepted from the user via the screen illustrated in FIG. 3, for example.

In S402, the CPU 101 uses the moving image obtaining unit 202 to obtain moving image data included in the storage region that is the object of searching.

In S403, the CPU 101 uses the moving image analyzing unit 203 to analyze the moving image data obtained in S402.

The CPU 101 in S404 cuts out a frame from the moving image data analyzed in S403, using the frame obtaining unit 204, and saves the frame that has been cut out in the HDD 104 as image data.

The CPU 101 performs determination in S405 for all moving image data included in the storage region that is the object of searching, whether or not the processing of S402 through S404 has ended. In a case where this has not ended (No in S405), the flow returns to S402, and moving image data that has not been processed yet is obtained. If ended (Yes in S405), the flow advances to S406.

In S406, the CPU 101 uses the image obtaining unit 205 to obtain image data included in the storage region that is the object of searching.

In S407, the CPU 101 performs image data conversion using the image converting unit 206.

In S408, the CUP 101 uses the image analyzing unit 207 to obtain feature amounts from image data that has been converted in S407. An example of feature amounts is focus.

The CPU 101 then in S409 uses the image analyzing unit 207 to execute object detection processing on the image data converted in S407. The CPU 101 detects faces of people from images represented by the image data converted in S407. The CPU 101 also obtains upper-left coordinate values and lower right coordinate values of the detected face images, as well as extracting facial images. Having these two types of coordinates enables the position of the face images and the size of the face images to be obtained. The CPU 101 can obtain information of the reliability of detected objects by performing face detection processing using AdaBoost (a machine learning meta-algorithm). Details of reliability will be described later. The CPU 101 may use AdaBoost to create strong discriminators with objects such as animals like dogs, cats, and so forth, flowers, cooking, buildings, decorative objects, vehicles, and so forth, as objects of detection, in this S409. Thus, the CPU 101 can detect objects besides faces, as well. In S409, the CPU 101 executes processing to detect animals and cooking, as well as processing to detect faces, in the present embodiment.

In S410, the CPU 101 executes personal recognition processing using the image analyzing unit 207. The CPU 101 identifies a person corresponding to a representative facial image of which similarity is equal to or above a threshold value and also has the highest similarity, as the person corresponding to a facial image extracted in S409. In a case where the similarity between a facial image extracted in S409 and all representative facial images saved in a facial dictionary database is below the threshold value the CPU 101 allocates the extracted facial image a new personal ID, and registers in the facial dictionary database as a new person.

Image analysis information illustrated in FIG. 5, regarding each image data obtained from S408 through S410 is stored in a storage region such as the RAM 103 or HDD 104, each associated with an image ID 501 for identifying each image data. For example, shooting date-and-time information 502 and focus determination results 504 obtained in S408, and the count 506 of facial images and position information 507 detected in S409, are stored in a table format, as illustrated in FIG. 5.

Image attributes 503 represents the attributes of each image data. For example, image data that is still image data obtained from a local server has "still image" attributes. Also, image data that has been cut out and saved from moving image data obtained from a local server has "moving image" attributes. Further, image data obtained from an SNS server has "SNS" attributes.

Object classification 505 indicates the category (type) of objects included in images represented by the image data, and the reliability of the category. In the present embodiment, objects of the three categories (types) "people", "animals", and "cooking" are detected, and information representing the category of objects detected in images that each image data represents is stored under the object classification 505. That is to say, object classification 505 is information indicating whether images represented by the image data include an object of any of the categories. This information may be managed by flags, for example. Also, the objects to be detected are not restricted to the three categories "people", "animals", and "cooking" as described above, so the object classification 505 may store information indicating categories of "flowers", "buildings", "decorative objects", "vehicles", and so forth.

Category reliability is information indicating how high the probability is that an object included in an image represented by the image data belongs to a certain category. The higher the reliability of the category is, the higher the probability is that the category is that of the object included in the image represented by the image data.

In S411, the CPU 101 determines whether or not the processing of S407 through S410 has ended regarding all image data included in the storage region that is the object of searching.

The CPU 101 uses the image classifying unit 208 to segment scenes in S412. Scene segmentation means segmenting all image data obtained in S401 through S411 into scenes, and managing as multiple image groups. Note that in the following description, individual image groups obtained by segmenting all image data (main image group) are referred to as sub-image groups. FIG. 6A illustrates an example of grouping taken image data. The horizontal axis in FIGS. 6A through 6C represents the shooting date-and-time (the farther to the left the older, and the farther to the right the newer), and the vertical axis indicates the shot image data count. FIG. 6A shows the shot image data group being segmented into eight sub-image groups 601 through 608. The arrows in FIG. 6A represent the boundaries between groups.

In S413, the CPU 101 uses the image classifying unit 208 to classify scenes. Specifically, the CPU 101 scores the sub-image groups obtained by scene segmentation in S412 by each type of scene, and classifies each sub-image group to a scene type of which the score is the highest. In the following description, the scoring in S413 will be referred to as scene classification scoring. The types of scenes in the present embodiment are "travels", "everyday life", and "ceremony", with each sub-image group being classified into one of these scenes. Note that a scene classification table storing feature amounts corresponding to each type of scene is used for scene classification scoring.

In the present embodiment, a table 700 illustrated in FIG. 7 is used as the scene classification table. In the table 700, an average value and standard deviation are registered for each of shooting period 702, count of image shot 703, and count of people taken 704, in correlation with each scene ID 701.

In S414, the CPU 101 determines whether or not scene classification in S413 has ended for all sub-image groups obtained in S412. If not ended (No in S414) the flow returns to S413, and scene classification is performed on sub-image groups not yet subjected to scene classification.

The CPU 101 uses the image scoring unit 210 to set the main character in S415. Setting of a main character is performed with regard to an image group that the user has specified, and is performed by one of two setting methods of automatic and manual.

In S416 the CPU 101 uses the image scoring unit 210 to perform image scoring. The image scoring in S416 is to appropriate each image data a score in accordance with a later-described perspective. This scoring is referenced when selecting image data representing images to be laid out in templates, which will be described later. A scoring method will be described with reference to FIGS. 8A, 8B, and 10.

Figure 10:
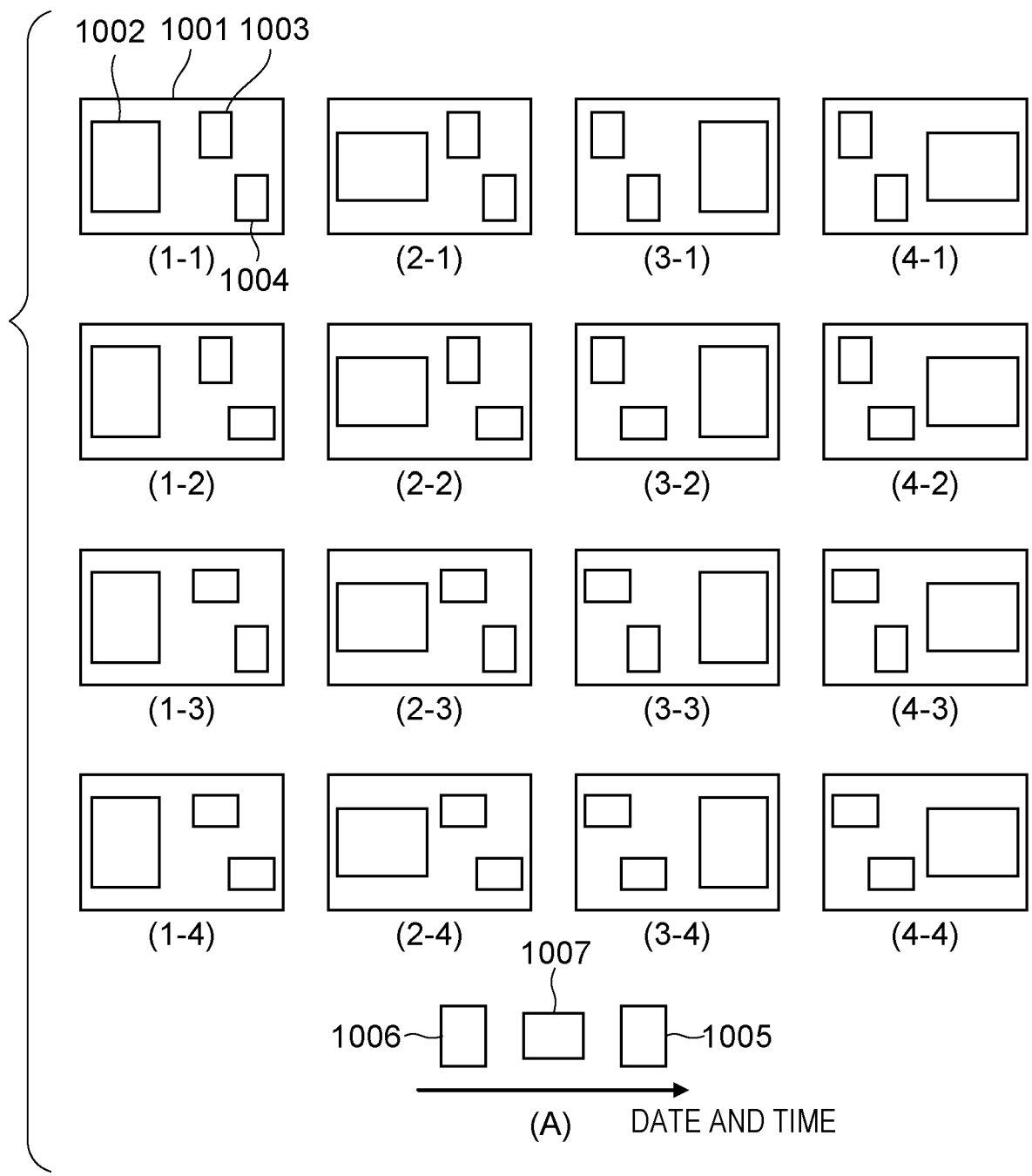
FIG. 10 is a diagram for describing layout of image data.

FIG. 10 represents a template group used for layout of image data. Each of the multiple templates included in the template group correspond to a double-page spread. A template 1001 is one template, a main slot 1002 represents a main slot, and sub-slots 1003 and 1004 indicate sub-slots. The main slot 1002 is a slot (frame for laying out an image) serving as a main slot in the template 1001, and is larger in size than the sub-slots 1003 and 1004. In S416, the CPU 101 performs processing of appropriating both main-slot points and sub-slot points, corresponding to the type of scene to which the image data belongs, to image data.

A slot features table, storing information of features amounts of images to be employed for the main slot and sub-slots, for each type of scene, is used in the image scoring. Accordingly, scoring relating to both the main slot and sub-slots is performed. Further, in the present embodiment, the CPU 101 adds points to scores calculated as described above, based on the mode specified at the album creation conditions specifying unit 201.

Note that the CPU 101 performs image scoring regarding each image data in the image data group specified by the user. The points added by the image scoring will serve as a selection reference in image selection processing later in S423. Thus, in the later-described image selection processing, the CPU 101 can select image data representing images containing objects of the category corresponding to the mode of the album with priority over image data representing images not containing these objects.

FIG. 8 illustrates an example of the results of scoring by image scoring. For example, image ID1 is appropriated 20 points for the main slot, and image ID2 is appropriated 45 points for the main slot. This means that image ID2 is closer to the judgement reference of the user to be used for the main slot.

The CPU 101 determines in S417 whether or not the image scoring of S416 has ended for all image data obtained by the image obtaining unit 205. In a case where this has not ended (No in S417) the flow returns to S416, and image scoring is performed on image data that has not yet been subjected to this processing.

In S418, the CPU 101 determines whether or not the scene count (number of sub-image groups) obtained by the scene segmenting in S412 is the same as the double-page spread count (the number of double-page spreads input to the double-page spread box 305) input by the double-page spread count input unit 211.

In S419, the CPU 101 uses the double-page spread allocating unit 212 to determine whether or not the number of scenes obtained by the scene segmenting in S412 is smaller than the number of double-page spreads input by the double-page spread count input unit 211.

In S420, the CPU 101 uses the double-page spread allocating unit 212 to perform sub-scene segmentation. Sub-scene segmentation is to further segment scenes obtained by scene segmentation in a case where the number of scene segments is smaller than the number of double-page spreads. Specifically, the CPU 101 performs sub-scene segmentation so that the scene count and double-page spread count agree. Description will be made here regarding a case where the scene count is eight as shown in FIG. 6A, and the double-page spread count is ten. FIG. 6B shows the results of having performed sub-scene segmentation with regard to FIG. 6A. The scenes before and after the points indicated by dotted arrows have been segmented, thereby yielding a segment count of ten.

In S421, the CPU 101 uses the double-page spread allocating unit 212 to perform scene integration. Scene segmentation is to integrate scenes obtained by scene segmentation in a case where the number of scene segments is greater than the number of double-page spreads. Specifically, the CPU 101 performs scene integration so that the scene count and double-page spread count agree. Description will be made here regarding a case where the scene segment count is eight as shown in FIG. 6A, and the specified double-page spread count is six. FIG. 6C shows the results of having performed scene integration with regard to FIG. 6A. The scenes before and after the points indicated by dotted lines are integrated, thereby yielding a segment count of six.

The CPU 101 uses the double-page spread allocating unit 212 to perform double-page spread allocation in S422. The sub-image group count and specified double-page spread count are the same, as the result of S418 through S421 having been performed. The sub-image groups of which the shooting date-and-time is earlier are allocated first to the double-page spread in the present embodiment. That is to say, the sub-image groups are allocated to the double-page spreads of the album in order of shooting date-and-time. Accordingly, an album where sub-image groups are arrayed in shooting date-and-time can be created.

In S423, the CPU 101 uses the image selecting unit 213 to perform image selection. An example of selecting four image data from a segmented image data group allocated to a certain double-page spread will be described here with reference to FIGS. 9A through 9I. Note that although a double-page spread is a two-page region, the first double-page spread and the last double-page spread will each be single-page regions.

FIG. 9A illustrates the time difference (segment shooting period) in the shooting date-and-time between the image data of which the shooting date-and-time is earliest and the image data of which the shooting date-and-time is the latest, out of the segmented image data group allocated to the double-page spread, in other words, the shooting period of the segmented image data group. Selection of image data is performed in the order of main slot and sub-slots. One main slot 1002 is included in the template corresponding to the double-page spread. Accordingly, the image data selected as the first is image data for the main slot. The CPU 101 selects image data (1) that has the highest score of main slot points added in S416, out of the image data corresponding to the segment shooting period illustrated in FIG. 9B, as the image data for the main slot.

Image data selected for the second and thereafter is sub-slot image data. Selection of image data for the second and thereafter is performed by a method described below, so as to not be concentrated on one part of the segment shooting period. First, the CPU 101 segments the segment shooting period into two, as illustrated in FIG. 9(C). Next, the CPU 101 selects the second image data from image data generated in a segment shooting period from which the first image data has not been selected (the period indicated by the solid line) as illustrated in FIG. 9D. The image data (2), of which the sub-slot points is the highest out of the image data generated in the segment shooting period where the first image data has not been selected, is selected for the second image data. The CPU 101 then segments into two each segment shooting period in FIG. 9D, as illustrated in FIG. 9(E). The CPU 101 selects the third image data from image data generated in a segment shooting period from which the first image data and second image data have not been selected (the period indicated by the solid line) as illustrated in FIG. 9F. The image data (3), of which the sub-slot points is the highest out of the image data generated in the segment shooting period where the first image data and second image data have not been selected, is selected for the third image data. For the fourth image data, image data of which the sub-slot points is the highest out of the image data generated in the segment shooting period where the first, second, and third image data have not been selected, is selected.

Next, a case will be described where no image exists that has been generated in the segment shooting period where the first, second, and third image data have not been selected, and fourth image data cannot be selected from image data generated in this segment shooting period. Assumption will be made that there is no image data generated in a segment shooting period where no image data has been selected (the periods indicated by slated lines), as illustrated in FIG. 9G. In this case, the CPU 101 further segments into two each segment shooting period, as illustrated in FIG. 9H. Next, the CPU 101 selects the fourth image data from images generated in a segment shooting period other than a segment shooting period where it has been recognized that there is no image data generated within the period, and from a period from which image data has not been selected yet (the periods indicated by the solid lines), as illustrated in FIG. 9I. The CPU 101 selects the image data (4), of which the sub-slot points is the highest out of the image data generated in this segment shooting period, for the fourth image data.

In S424, the CPU 101 uses the template setting unit 214 to obtain multiple templates in accordance with template information specified from the album creation conditions specifying unit 201.

In S425, the CPU 101 uses the image layout unit 215 to decide a double-page spread image layout to be processed.

In S426, the CPU uses the image correcting unit 217 to perform image correction.

In S427, the CPU 101 uses the layout information output unit 218 to create layout information. Specifically, the CPU 101 manages the slots of the template selected in S425 in a manner associated with the image data corresponding to each slot on which the image correction in S426 is executed. Note that the image used here is the analysis image generated in S407, which is different from the images used in S408 through S418. The CPU 101 generates bitmap data where the images have been laid out in the template. The CPU 101 scales the images to be laid out in accordance with size information of the slots.

In S428, determination is made regarding whether processing of S423 through S427 has ended for all double-page spreads. In a case where this has not ended (No in S428), the flow returns to S423, and the processing of S423 through S427 is performed on double-page spreads that have not been processed yet.

Upon automatic layout processing ending, the CPU 101 displays a layout image, where images have been laid out in the template based on the created layout information, on the display device 105. The CPU 101 may display multiple layout images for creating a single album at this time. The CPU 101 may also transmit the created layout information to a printer such as the image forming apparatus 200 or the like, and print the layout image. The album is created by printing of the layout image.

Note that description has been made above that the layout image is generated in the automatic layout processing by templates and image data being selected automatically (without accepting selection instructions from the user) by the album creation application. However, images represented by layout information are not restricted to those including images represented by templates and image data. The reason is that the layout information according to the present embodiment is used to create an album, and an album will also include regions where images represented by image data are not normally printed, such as the so-called endleaf, flyleaf, half-title, and copyright page. The layout information according to the present embodiment also represents images corresponding to the endleaf, flyleaf, half-title, and copyright page. Data for representing these images are not generated by the above-described automatic layout processing, so data created beforehand for images corresponding to the endleaf, flyleaf, half-title, and copyright page are to be included in the layout information at one timing or another.

Note that details of the automatic layout processing according to the present embodiment are not restricted to the arrangement described above. For example, methods of selection of templates to be used for the album, and selection of image data representing images to be laid out in the templates, are not restricted to the above arrangement. It is sufficient for the arrangement to be able to create layout information without the user executing selection of templates to be used for the album, and selection of image data representing images to be laid out in the templates, at the least.

Editing Album

After creating the layout information as described above, the CPU 101 displays a scene for accepting editing of the album represented by the created layout information. Note that the user can confirm the contents of the album represented by layout information created by the automatic layout processing. Hereinafter, such a screen will be referred to as an editing screen. One of the multiple double-page spreads that the album represented by the created layout information has is displayed in an editing screen, and the double-page spread being displayed is switched in accordance with user operations. Note that the album may be displayed in increments of pages in an editing screen, instead of increments of double-page spreads at this time. Also note that the double-page spread displayed in the editing screen displayed immediately after the automatic layout processing is not restricted in particular, and may be the first double-page spread out of multiple double-page spreads for example, or may be a double-page spread with the highest importance level, which will be described later. In the present embodiment, assumption will be made that the double-page spread displayed in the editing screen displayed immediately after the automatic layout processing is the very first double-page spread (the double-page spread of which the double-page spread name is "front cover"), out of multiple double-page spreads.

FIG. 12 illustrates an example of an editing screen. A display region 1201 represents one double-page spread. The term "one double-page spread" as used here indicates a region of two pages worth facing each other in an album. In the present embodiment, one double-page spread corresponds to one template, so one template and images laid out thereupon are displayed in the display region 1201. Note that the relation between the front cover and back cover does not fit the above definition of double-page spread, but in the present embodiment, the front cover and back cover are deemed to be a single double-page spread, and the display region 1201 displays the front cover and back cover side by side. The display region 1201 is not restricted to the arrangement where one double-page spread is displayed, and an arrangement may be made where one page is displayed at a time, for example. The display region 1201 may switch between a state where one double-page spread is displayed and a state where one page is displayed. In this case, for example, the display region 1201 displays the front cover and back cover in a state representing one page, and displays the text block pages in a state of display one double-page spread.

Slots 1209 are slots that the double-page spread displayed in the display region 1201 has. A text box 1210 is a region that the double-page spread displayed in the display region 1201 has, and is a region that can receive input of text.

A thumbnail region 1202 is a region where thumbnails corresponding to the double-page spreads of the album can be viewed as a list. In a case where the user has selected a thumbnail, the double-page spread correspond to the selected thumbnail is displayed in the display region 1201. That is to say, the user can view the double-page spread corresponding to the selected thumbnail by selecting the thumbnail.

An icon 1203 is an icon indicating that the double-page spread corresponding to the thumbnail has not been viewed yet. Although FIG. 12 depicts the icon 1203 as a checkmark, this arrangement is not restrictive, and may be a circle or some other mark, for example.

Double-page spread feed buttons 1204 and 1205 are buttons for switching the double-page spreads to be displayed on the display region 1201. In a case where the double-page spread feed button 1204 is pressed, the double-page spread that was displayed before the double-page spread displayed in the display region 1201 is displayed. In a case where the double-page spread feed button 1205 is pressed, the double-page spread after the double-page spread displayed in the display region 1201 is displayed. Thus, the user can switch double-page spreads displayed in the display region 1201 by operating these buttons without using method of selecting thumbnails in the thumbnail region 1202.

An album edit button 1206 is a button for changing setting relating to the overall album. Note that the term overall album refers to all double-page spreads and pages included in the album. That is to say, the user can edit or change the overall album at one time, by pressing the album edit button 1206. Note that it is not necessary for settings to be changed regarding all double-page spreads and pages included in the album by the album edit button 1206, and it is sufficient for settings to be changed regarding at least one or more double-page spreads or pages.

A double-page spread edit button 1207 is a button for changing setting regarding the double-page spread currently displayed on the display region 1201. Specifically, the double-page spread edit button 1207 is a button for changing templates corresponding to double-page spreads, changing images included in double-page spreads, changing level of importance of double-page spreads, and adding/inputting text, for example. Note that changes to setting relating to the double-page spread displayed in the display region 1201 can also be performed by direct operations at the slots 1209 and text box 1210, for example.

An album order button 1208 is a button for ordering an album. In a case where the album order button 1208 is pressed (an output operation is executed), layout information of settings at that time are transmitted (uploaded) to the external server 400, and the album is created based on this layout information.

Note that in the present embodiment, the user can change the double-page spread that is displayed on the display region 1201 to an adjacent double-page spread, by performing a flick operation on the display region 1201. Further, in the present embodiment, when the user performs a flick operation, an animation is run that depicts pages of an album being turned, and the double-page spread displayed on the display region 1201 is changed. Note that a flick operation is an operation where a touch panel is touched with an operator such as a finger or the like, following which the operator in contact with the touch panel is flicked in one direction.

Figure 16A:
FIGS. 16A and 16B are diagrams illustrating what is shown in a display region in a state where a page-turning animation is in operation.
Figure 16B:

For example, in a case where a flick operation is performed toward the left direction in the region to the right side of the display region 1201, an animation is run that depicts the page to the right side of the double-page spread displayed on the display region 1201 being turned toward the left side with a center line dividing the double-page spread into two as a fulcrum. FIGS. 16A and 16B illustrate the state of this animation running in the display region 1201. The page is turned, whereby the next double-page spread is displayed in the display region 1201, as illustrated in FIGS. 16A and 16B. Also for example, in a case where a flick operation is performed toward the right direction in the region to the left side of the display region 1201, an animation is run that depicts the page to the left side of the double-page spread displayed on the display region 1201 being turned toward the right side with a center line dividing the double-page spread into two as a fulcrum. Thus, the previous double-page spread is displayed in the display region 1201.

Now, the movement of pages when pages of an actual album are being turned will be considered. When turning the pages of an actual album as well, the user uses a finger in contact with the page to flick in one direction, as with a flick operation. At this time, the movement of the page of the actual album being turned differs depending on the speed of flicking with the finger, the position on the page with which the finger is in contact, and so forth. The movement of pages of an actual album being turned also differs depending on the material and hardness of the page being turned. An arrangement is provided in the present embodiment where movement of pages actually being turned is expressed in a more realistic manner in an animation where pages displayed on a display unit are being turned, to increase user satisfaction.

Turning Pages

Figure 13A:
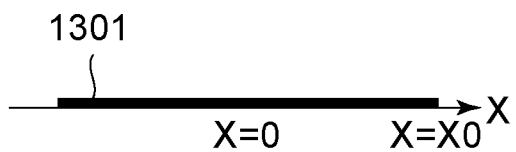
FIGS. 13A through 13E are schematic diagrams for describing a display control method.

FIGS. 13A through 13E are cross-sectional views schematically illustrating the state of a double-page spread when a page of a double-page spread displayed on the display region 1201 is being turned. The position of X=0 is the position of the center line (binding portion) dividing the double-page spread into two. That is to say, to the right side of X=0 is the right-side page of the double-page spread, and to the left side of X=0 is the left-side page of the double-page spread. Each page in the schematic diagrams turn upwards in the Y direction, with X=0 as a fulcrum. FIG. 13A is a schematic diagram in a state where the operator is not in touch with the display region 1201, with the double-page spread being completely opened and placed on a flat surface.

Figure 13B:
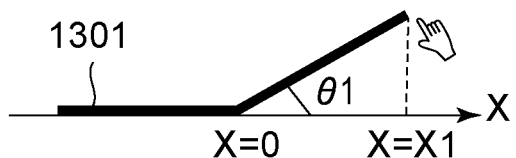
Figure 13C:
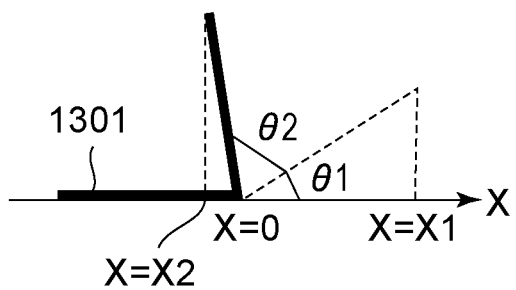

When an operator comes into contact with a position X=X1 in the display region 1201 in the state illustrated in FIG. 13A, the page turns in the present embodiment so that the position of the edge of the page that the operator has touched moves to the position where the operator has come into contact with. FIG. 13B illustrates the state after the page has turned. Angle θ1 is the angle between the horizontal axis and the page that has turned. The state in FIG. 13B is also achieved by the operator coming into contact with a position further to the right side or left side of the position X=X1 to the right side of the page, and thereafter moved (dragged) to the position X=X1 without leaving the touch panel. In a case of the operator further moving (being dragged) from the state in FIG. 13B without leaving the touch panel, that page further turns to that the position of the edge of the page touched by the operator in the X direction moves to the position where the operator is touching.

Note that in the present embodiment, description has been made above that the page turns so that the position in the X direction of the edge of the page touched by the operator moves to the position where the operator is touching, but this arrangement is not restrictive. For example, an arrangement may be made where, in a case where the operator comes into contact with the page, the page is turned so that the position in the X direction of the edge of the page touched by the operator moves to a certain position, regardless of the position where the operator has touched. Also, the amount of movement of the page turning due to the operator having been dragged may change in accordance with the position of the operator on the page. For example, an arrangement may be made where the closer to the center line side that the operator is positioned, the greater the amount of movement of the page turning due to the operator having been dragged is.

Assumption will be made that, in the state illustrated in FIG. 13B, the operator has been flicked toward the center line side. The page that the operator has been in contact with turns to the center line side due to the flicking operation. Angle θ2 is the angle between the page before the flicking operation has been performed and the page which has been turned due to the flicking operation. The magnitude of θ2 becomes greater in accordance with the amount of movement of the page turning due to the flicking operation, and in the present embodiment, the amount of movement of the page turning due to the flicking operation is dependent on the flicking velocity of the flicking operation. Thus, movement of a page actually being turned can be reproduced in a more realistic manner.

Flick velocity is the velocity at which the operator travels due to the flicking operation. For example, flick velocity is a velocity calculated from the distance between the position at which the operator was stationary before performing the flicking operation and the position at which the operator has left the surface of the touch panel, and the duration of time of the operator being in contact with the touch panel during the flicking operation. The faster the flick velocity is, the greater the page is deemed to have been turned.

In a case where the position in the X direction of the edge of the page after having turned due to a flicking operation crosses the center line (i.e., θ1+θ2 exceeds π/2 (90°)), the page that has been flicked continues to turn until it overlays the other page in the double-page spread. As a result, the double-page spread that had been displayed at the time of the flicking operation is closed, and another double-page spread is displayed. In the state illustrated in FIG. 13C, θ1+θ2 exceeds π/2, so the page is completely turned and a new double-page spread is displayed.

On the other hand, in a case where the position in the X direction of the edge of the page after having turned due to a flicking operation does not cross the center line (i.e., θ1+θ2 does not exceed π/2 (90°)), the page that has been flicked turns to the position corresponding to the flicking operation, and then falls back to the original position. That is to say, in a case where the flick velocity is slow, for example, the page turns to the state illustrated in FIG. 13D, and then returns to the state illustrated in FIG. 13A (the state before the flicking operation). In this case, the page is not turned, so a new double-page spread is not displayed. In the present embodiment, the page turns under operations other than flicking operations (an operation of touching the display unit before the flicking operation is performed), so whether the page will be turned is determined taking the amount of movement due to this turning into consideration.

Figure 14:
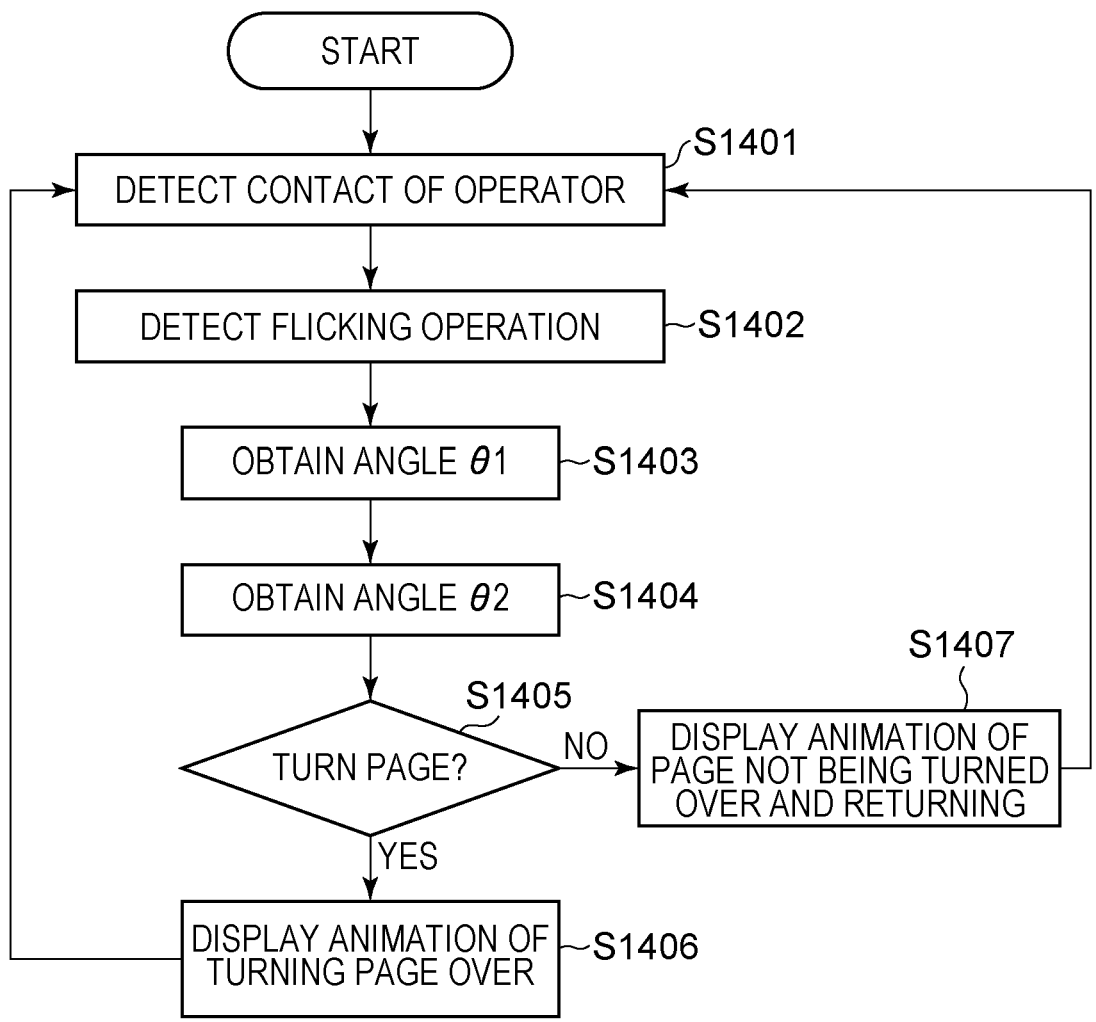
FIG. 14 is a flowchart for describing the display control method.

FIG. 14 is a flowchart illustrating page turning processing executed by the album creation application according to the present embodiment. The flowchart illustrated in FIG. 14 is realized by a program corresponding to the album creation application stored in the HDD 104 being read out to the ROM 102 and RAM 103 and executed by the CPU 101. The flowchart illustrated in FIG. 14 is started in a state where the editing screen is displayed.

In S1401, the CPU 101 detects the contact of the operator in the display region 1201. The CPU 101 then controls display of the display region 1201 so that the page displayed at the position where the operator has come into contact turns in accordance with the position where the operator has touched.

Next, in S1402, the CPU 101 detects a flicking operation in the display region 1201. The CPU 101 obtains information relating to the detected flicking operation. Specifically, the CPU 101 first obtains the flick velocity V of the detected flicking operation. The flick velocity V is obtained from the OS installed in the image processing apparatus 100 (Android, iOS, etc.). Two velocities are defined for flick velocity V, one being the flick velocity in the horizontal X direction (horizontal velocity) and the other being the flick velocity in the vertical Y direction (vertical velocity). Of the above two, the one used in the page-turning processing is the flick velocity corresponding to the direction in which the page is turned. The page is turned in the horizontal X direction in the present embodiment, so the flick velocity in the horizontal X direction (horizontal velocity) is used.

Next, in S1403, upon detecting a flicking operation, the CPU 101 obtains the angle θ1 that the displayed page assumed when the flicking operation was detected (immediately before the flicking operation was performed). Note that the angle θ1 is equivalent to the amount of movement of the page from the state in FIG. 13A to the position before contact to the position at the start of the flicking operation. The CPU 101 calculates the value of the angle θ1 from the position of the operator when the flicking operation was detected (immediately before the flicking operation) and the length of the page in the X direction.

Next, in S1404, the CPU 101 obtains the angle θ2 to which the page turns by the flicking operation based on the flick velocity. An example of calculation of θ2 is $$\theta2 = (V/V\max) \times \pi \quad \text{(Expression 1)}$$

where V represents flick velocity and V max is the maximum value of flick velocity that the OS and software installed in the image processing apparatus 100 can handle. V max is a fixed value defined by the OS or software or the like, and even if the user performs a flicking operation faster than this, the flick velocity V will never exceed V max. According to this calculation expression, the value of θ2 increases proportionately to the value of flick velocity V. That is to say, the greater the value of flick velocity V is, the greater the amount of movement of the turning page is.

In S1405, the CPU 101 determines whether or not to display the animation where the page that has received the flicking operation turns to pass over the center line. In other words, the CPU 101 determines whether or not to display the next double-page spread following the double-page spread including the page that has received the flicking operation. Specifically, the CPU 101 determines whether or not θ1+θ2 exceeds π/2. In a case where θ1+θ2 exceeds π/2, the CPU 101 identifies the animation where the page that has received the flicking operation turns to pass over the center line, and advances to S1406. In step S1406, the CPU 101 performs display control to display the identified animation (the animation where the page that has received the flicking operation turns), and display the next double-page spread. On the other hand, in a case where θ1+θ2 does not exceed π/2, the CPU 101 identifies the animation where the page that has received the flicking operation turns but does not pass over the center line, and advances to S1407. In step S1407, the CPU 101 displays the identified animation (the animation where the page does not turn over and returns to the original position). Specifically, the CPU 101 performs display control where the page that has received the flicking operation turns toward the center line side by an amount equivalent to θ2, and then turns back away from the center line side, to return to the original position.

The velocity of a page being turned by a flicking operation will be described. The present embodiment assumes that inertial velocity L and fall velocity M are contributing factors in the velocity of the page turning. The inertial velocity L is the velocity of the page that has received the flicking operation turning toward the center line side, and in other words, is the velocity of the page from the state in FIG. 13B to the state in FIG. 13D. On the other hand, the fall velocity M is the velocity of the page that has received the flicking operation returning to the original position, after having turned toward the center line side but has stopped without crossing over the center line, and in other words, is the velocity from returning to the state in FIG. 13A from the state in FIG. 13D.

Calculation of an initial velocity L0 of the inertial velocity L (the velocity at the time of the operator leaving the surface of the touch panel in the flicking operation) can be expressed as $$L0 = k \times (V/V \max) \quad \text{(Expression 2)}$$

where k is a positive constant, V represents the flick velocity described above, and V max is the maximum value of the flick velocity as described above. The initial velocity L0 of the inertial velocity L is dependent on the flick velocity, and is the fastest velocity of inertial velocity L, at the position where the operator has left the surface of the touch panel in the flicking operation. The inertial velocity L gradually decreases from its greatest value of initial velocity L0.

In a case where the page that has received the flicking operation does not turn to pass over the center line, the initial velocity L reaches zero at the position where the angle of the page is at θ2. That is to say, the page stops at a position short of the center line. In a case where the page that has received the flicking operation turns to pass over the center line, the value of initial velocity L gradually decreases until reaching the vertex (position of center line). Changing the value of the initial velocity L to gradually fall can be realized by using OutQuad type easing. An animation where the velocity of the turning page gradually drops can be used to express page turning, by gradually bringing the initial velocity L to zero by easing type OutQuad. While easing type OutQuad is used here to reduce the value of the initial velocity L, the initial velocity L may be reduced linearly.

Next, the fall velocity M will be described. The initial velocity M0 of the fall velocity M (the velocity of the page at the position where turning toward the center line side has stopped) is zero. The fall velocity M gradually increases as turning toward the opposite side from the center line side advances. Changing the value of the fall velocity M to gradually increase can be realized by using InQuad type easing. An animation where the page falls while gradually gaining speed due to gravity can thus be expressed. Note that in a case where the page turns past the center line due to the flicking operation, after the page has passed the center line, it turns to the opposite side from the center line side, and the same sort of easing is used to express turning of the page.

Note that actions when a page of an actually bound photo album is turned also differ depending on the thickness of the page. For example, the cover of a hardbound album is thick, and will stay stopped near the vertex when turned, as compared to the cover or text block pages of a paperback. Note that the vertex is the position of X=0, and on other words, is the position where the page has turned π/2 from the initial state (FIG. 13A). The reason why the duration of the cover of a hardbound album near the vertex is long is that the cover of a hardbound album is thicker than the cover of a paperback album or text block pages. In an arrangement where the actions of pages being turned are expressed by animation, as in the present embodiment, the actions of the pages may be changed depending on what sort of thickness the page being displayed has.

Figure 13D:
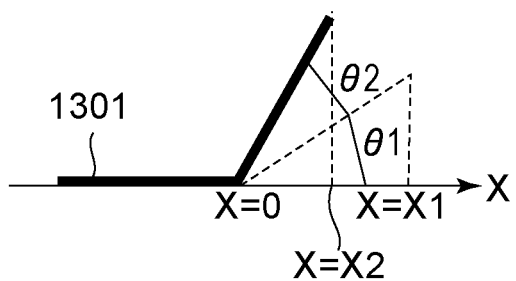
Figure 13E:
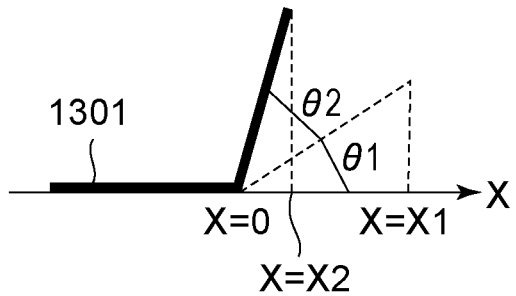

FIG. 13E illustrates a state where the cover of a hardbound album is turned by a flicking operation and stops short of the center line. The page in the state illustrated in FIG. 13E is closer to the vertex (π/2) than the page in the state illustrated in FIG. 13D.

In the present embodiment, in a case where the initial velocity L reaches zero near the vertex in this way, the method of changing the initial velocity L and fall velocity M is changed in accordance with the thickness of the page. Here, a case of a page that has great thickness, as in the case of a cover of a hardbound album, is being turned, will be described.

While the value of initial velocity L was gradually reduced using easing type OutQuad in the example illustrated in FIG. 13D (example where thickness of page is small), easing type OutCubic is used to reduce the value in an example where the thickness of the page is great. Using an OutCubic curve yields decrease in the degree velocity partway through that is greater than in a case of using an OutQuad curve, and the degree of decrease in velocity toward the end is smaller than in a case of using an OutQuad curve. That is to say, using the easing type OutCubic yields a decrease in velocity toward the end in unit time (when turning in the turning range at the center line side) that is greater than a case of using easing type OutQuad. Accordingly, when the page nears the vertex by turning toward the center line side, the duration of time where the initial velocity L is near zero is longer, so page turning can be expressed with an animation where the page is stopped near the vertex. In the example where a page having a great thickness turns toward the center line side, it is sufficient if the degree of decrease of velocity is greater toward the end (when turning in the turning range at the center line side), and the degree of decrease in velocity at the start or partway through is not restricted.

On the other hand, while the value of fall velocity M was gradually increased using easing type InQuad in the example illustrated in FIG. 13D (example where thickness of page is small), easing type InCubic is used to reduce the value in an example where the thickness of the page is great. Using an InCubic curve yields increase in the degree velocity partway through that is smaller than in a case of using an InQuad curve, and the degree of decrease in velocity toward the end is greater than in a case of using an InQuad curve. That is to say, using the easing type InCubic (case where thickness of page is great) yields an increase in velocity that is greater in degree per unit time than a case of using easing type InQuad (case where thickness of page is small). Accordingly, the fall velocity M does not increase very much near the vertex, so the page falling can be expressed with an animation where the page is stopped near the vertex. In the example where a page having a great thickness turns away from the center line side, it is sufficient if the degree of decrease of velocity is small at the start per unit time (when turning in the turning range at the center line side), and the degree of increase in velocity partway through or at the end is not restricted. Note that in a case where the page turns past the center line by a flicking operation, the page turns to the other side as to the center line side after having passed the center line, and the same sort of easing is used in the turning of the page.

Although change in velocity has been expressed in the present embodiment using OutCubic and InCubic, the present disclosure is not restricted to this. It is sufficient as long as an easing type is used that can express the degree of change in velocity becoming small near the vertex is used.

Also, description has been made above that animation where the turning velocity gradually changes is displayed for a case of a thick hardbound cover turning and a case of a thin page turning, but this arrangement is not restrictive. For example, animation where the turning velocity does not change may be displayed in a case of a thin page turning. Also, an arrangement may be made where, in a case of a thick page turning or a thin page turning, the turning velocity does not change at part of the turning range, and the turning velocity changes at the remaining turning range.

Also, an example has been described where the page turning animation is changed between a case of a thick hardbound cover turning and a case of a thin content page other than the cover turning, but this arrangement is not restrictive. For example, the text block pages will include pages using lightweight paper such as endleaf sheets, and relatively heavy pages where photographs are laid out, so animation may be changed among these.

In a case of changing animation in accordance with the thickness of pages as described above, the CPU 101 confirms information correlated with the page subjected to the flicking operation. Information correlated with each page includes the thickness, material, type (whether cover or text block, etc.) page No., and so forth, of each page. The CPU 101 references information included in the information corresponding to each page and changes the animation. Note that information other than that relating to the thickness of each page may be referred for which animation to be used out of multiple animations including animation for page turning of thick pages and animation for page turning of thin pages. For example, which animation to use may be decided in accordance with the material or type of each page, or depending on the page No.

Also, for example, information correlated with the page subjected to a flicking operation may be used in determining whether or not to display the next page in a case where a flicking operation is performed. For example, the amount of movement of a page where a thick page is subjected to a flicking operation is smaller than the amount of movement of a page where a thin page is subjected to a flicking operation.

Thus, according to the present embodiment, whether or not to turn the page that has been subjected to a flicking operation is determined by the flick velocity. That is to say, in the present embodiment, if the operator comes into contact with the page and then leaves the page without crossing a reference line (the center line here), the page can still be turned if the flick velocity is large enough. This can provide the user with a sense of operation closer to turning the pages of an actual book, in comparison with an arrangement where determination is made whether or not to turn the page in accordance with the position where the operator has left after touching the page, for example.

Although an arrangement has been described above where animation is switched between two patterns of turning a page in a case of a thick page and turning a page in a case of a thin page, this arrangement is not restrictive. Three or more patterns of animation in accordance with thickness of pages may be prepared.

Although an arrangement has been described in the embodiment above where the page turns by $\theta1$ by being touched by the operator, and thereafter the flicking operation is performed, this arrangement is not restrictive. That is to say, a flicking operation may be accepted without the page turning by $\theta1$. In this case, whether or not to display the next double-page spread may be determined depending on whether the value of $\theta2$ exceeds $\pi/2$ or not.

Although an arrangement has been described in the above embodiment where the display unit is a touch panel and the operator is a finger or pen, this arrangement is not restrictive. That is to say, the display unit is not restricted to being a touch panel, and the operator may be a pointing device such as a mouse or the like. In this case, the flicking operation will be an operation where the mouse is moved in a certain direction while clicked, and then the clicking is released. The state of clicking on the page with the mouse is equivalent to the state of touching the page on the touch panel with a finger. The operation of releasing the clicked state of the mouse is equivalent to the operation of the finger leaving the touch panel.

Although description has been made above that the amount of movement of a turning page is calculated in accordance with the flick velocity, and whether or not to turn the page (whether or not to display the next double-page spread) is determined in accordance with the calculated value, this arrangement is not restrictive. The amount of movement of the turning page is decided based on the value of the flick velocity, so determination may be made in S1405 (whether or not to turn the page (whether or not to display the next double-page spread)) may be determined and performed in accordance with the value of the flick velocity, without calculating the amount of movement of the turning page.

Although an example has been described in the above embodiment regarding animation to be displayed to turn the page displayed by data for creating a photo album, this arrangement is not restrictive. For example, this may be applied to animation for turning pages of electronic books, in software for viewing electronic books such as novels, magazines, comics, and so forth, for example.

Although an arrangement has been described in the above embodiment where double-page spreads of a book are displayed in an editing screen, this arrangement is not restrictive. For example, an arrangement may be made where only one page of a double-page spread is displayed, and the way in which this page is turned is displayed. Also, while the pages have been described above as being turned on the center line of the double-page spread as a fulcrum, the fulcrum serving as the center of turning may be set at any position.

The above-described embodiment may be realized by executing processing where software (program) realizing the functions of the above-described embodiment is supplied to a system or device via a network or various types of storage media, and a computer (CPU, microprocessor unit (MPU), etc.) of the system or computer reads out and executes the program. The program may be executed at one computer, or may be cooperatively executed on multiple computers. Not all of the above-described processing needs to be executed by software, and an arrangement may be made where part or all of the processing is executed by hardware such as an application specific integrated circuit (ASIC) or the like. The arrangement where a single CPU performs all processing is not restrictive either, and multiple CPUs may perform processing, cooperating as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-193779 filed Oct. 3, 2017, which is hereby incorporated by reference herein in its entirety.

What is claimed is:

1. A control method of an image processing apparatus, the control method comprising:
    displaying a page on a display unit;
    performing first identification for identifying an angle by which a first page is turned by a first display process of displaying an animation on the display unit, wherein the first display process is performed before a moving operation is performed based on a touch operation having been performed, wherein a moving operation is a flicking operation, wherein the animation shows that a first page is turned by a predetermined angle around a reference line, wherein the touch operation is an operation of touching with an operator a predetermined region where the first page is displayed, and wherein the flicking operation, is an operation of moving the operator with which the predetermined region has been touched by the touch operation in a direction toward the reference line;
    performing second identification for identifying an angle by which the page turns by the flicking operation, based on a movement velocity of the operator in the flicking operation performed in the predetermined region;
    performing third identification for finding a sum of the identified angle of turning of the first page by the first display process performed based on the touch operation having been performed before performing the flicking operation and the angle identified based on the movement velocity of the flicking operation; and
    controlling, in a case where the flicking operation is performed after performing the first display process, whether or not to perform a second display process based on whether or not the found sum is greater than a predetermined threshold;
    wherein the second display process is a process for displaying, on the display unit, a predetermined animation showing that the first page after turning by the first display process further turns around the reference line such that an edge of the first page goes across a position of the reference line, and
    wherein, in a case where the second display process is performed, a page displayed in the predetermined region is changed from the first page to a second page.

2. The control method according to claim 1,
    wherein, in a case where the flicking operation is performed in the predetermined region and the movement velocity is at or above a predetermined value, the second display process is performed, and in a case where the flicking operation is performed in the predetermined region and the movement velocity is below the predetermined value, the second display process is not performed.

3. The control method according to claim 1,
    wherein the first page is displayed in parallel in the predetermined region and another region that differs from the predetermined region.

4. The control method according to claim 1,
    wherein, in a case where the predetermined animation is displayed, any one of a plurality of the predetermined animations that each differ regarding a degree of change in velocity per unit time when the page is turning, in at least part of a turning range, is displayed, based on information correlated with the page.

5. The control method according to claim 4,
    wherein the information correlated with the page is at least one of information relating to a thickness of the page, information relating to material of the page, information relating to a type of the page, and information relating to page No. of the page.

6. The control method according to claim 5,
wherein, in a case where the information correlated with the page is information corresponding to the page being of a first thickness, and the predetermined animation is to be displayed, control is effected so that a first animation of the plurality of predetermined animations is displayed,
and wherein, in a case where the information correlated with the page is information corresponding to the page being of a second thickness that is greater than the first thickness, and the predetermined animation is to be displayed, control is effected so that, out of the plurality of predetermined animations, a second animation that has a degree of decrease in velocity per unit time when the page turns to a reference line side that is greater in at least part of a turning range at the reference line side than the first animation, is displayed.

7. The control method according to claim 5,
wherein, in a case where the information correlated with the page is information corresponding to the page being of a first thickness, and the predetermined animation is to be displayed, control is effected so that a first animation of the plurality of predetermined animations is displayed,
and wherein, in a case where the information correlated with the page is information corresponding to the page being of a second thickness that is greater than the first thickness, and the predetermined animation is to be displayed, control is effected so that, out of the plurality of predetermined animations, a second animation that has a degree of increase in velocity per unit time when the page turns to the opposite side from a reference line side that is smaller in at least part of a turning range at the reference line side than the first animation, is displayed.

8. The control method according to claim 1,
wherein, in a case where the flicking operation is performed in the predetermined region, but control is not effected to change the first page displayed in the predetermined region to the second page, control is effected so that the predetermined animation is not displayed at the display unit, and an animation indicating a way in which the first page turns on the reference line as an axis without the edge of the first page passing the position of the reference line is displayed on the display unit.

9. The control method according to claim 8,
wherein, after displaying of the animation indicating the way in which the first page turns on the reference line as an axis without the edge of the first page passing the position of the reference line on the display unit, an animation indicating the way in which the first page returns to the position before accepting the flicking operation is displayed.

10. The control method according to claim 1,
wherein the page is a layout image where images to be laid out are laid out in slots of a template.

11. The control method according to claim 10, further comprising:
first selecting of automatically selecting at least one template from a plurality of templates, without accepting selection instructions from a user; and
second selecting of automatically selecting at least one image data from a plurality of image data, without accepting selection instructions from a user,
wherein the layout image is an image where images to be laid out, represented by selected image data, are laid out in slots in the selected template.

12. The control method according to claim 1,
wherein the predetermined region for displaying the first page, and a particular region for displaying a third page, are displayed on the display unit,
and wherein, in a case where the flicking operation is performed in the predetermined region, the page displayed in the predetermined region is changed from the first page to the second page,
and wherein, in a case where the flicking operation is performed in the predetermined region, a page displayed in the particular region is changed from the third page to a fourth page.

13. The control method according to claim 1, further comprising:
accepting output operations of outputting the page,
wherein, in a case where the output operation is accepted, output relating to the page is performed, and
wherein the output relating to the page is at least one of printing the page by an image forming apparatus and transmitting image data representing the page to outside the image processing apparatus.

14. The control method according to claim 1,
wherein the angle of turning of the first page before performing the flicking operation is identified according to a position where the touch operation has been performed in the predetermined region.

15. The control method according to claim 1,
wherein the angle of turning of the first page before performing the flicking operation is identified according to a position where the touch operation has been performed in the predetermined region and a length from the reference line to the edge of the first page.

16. An image processing apparatus comprising:
a display unit configured to display page on a display unit;
a performance unit configured to identify an angle by which a first page is turned by a first display process of displaying an animation on the display unit, wherein the first display process is performed before a moving operation is performed based on a touch operation having been performed, wherein a moving operation is a flicking operation, wherein the animation shows that a first page is turned by a predetermined angle around a reference line, wherein the touch operation is an operation of touching with an operator a predetermined region where the first page is displayed, and wherein the flicking operation is an operation of moving the operator with which the predetermined region has been touched by the touch operation in a direction toward the reference line;
a moving image obtaining unit configured to identify an angle by which the page turns by the flicking operation, based on a movement velocity of the operator in the flicking operation performed in the predetermined region;
a moving image analyzing unit configured to find a sum of the identified angle of turning of the first page by the first display process performed based on the touch operation having been performed before performing the flicking operation and the angle identified based on the movement velocity of the flicking operation; and
a control unit configured to control, in a case where the flicking operation is performed after performing the first display process, whether or not to perform a second display process based on whether or not the found sum is greater than a predetermined threshold;

wherein the second display process is a process for displaying, on the display unit, a predetermined animation showing that the first page after turning by the first display process further turns around the reference line such that an edge of the first page goes across a position of the reference line, and wherein, in a case where the second display process is performed, a page displayed in the predetermined region is changed from the first page to a second page.

17. A non-transitory computer readable storage medium storing a program that causes a computer of an image processing apparatus to execute displaying a page on a display unit;

performing first identification for identifying an angle by which a first page is turned by a first display process of displaying an animation on the display unit, wherein the first display process is performed before a moving operation is performed based on a touch operation having been performed, wherein a moving operation is a flicking operation, wherein the animation shows that a first page is turned by a predetermined angle around a reference line, wherein the touch operation is an operation of touching with an operator a predetermined region where the first page is displayed, and wherein the flicking operation is an operation of moving the operator with which the predetermined region has been touched by the touch operation in a direction toward the reference line;

performing second identification for identifying an angle by which the page turns by the flicking operation, based on a movement velocity of the operator in the flicking operation performed in the predetermined region;

performing third identification for finding a sum of the identified angle of turning of the first page by the first display process performed based on the touch operation having been performed before performing the flicking operation and the angle identified based on the movement velocity of the flicking operation; and controlling, in a case where the flicking operation is performed after performing the first display process, whether or not to perform a second display process based on whether or not the found sum is greater than a predetermined threshold;

wherein the second display process is a process for displaying, on the display unit, a predetermined animation showing that the first page after turning by the first display process further turns around the reference line such that an edge of the first page goes across a position of the reference line, and wherein, in a case where the second display process is performed, a page displayed in the predetermined region is changed from the first page to a second page.

* * * * *